(12) United States Patent
Belen et al.

(10) Patent No.: US 12,234,939 B2
(45) Date of Patent: Feb. 25, 2025

(54) MALLEABLE PRESS FITTINGS

(71) Applicant: ASC Engineered Solutions, LLC, Exeter, NH (US)

(72) Inventors: Jordan Cameron Belen, Warwick, RI (US); Matthew William McNamara, Portsmouth, RI (US); Mark David Kirby, Sinking Spring, PA (US); Ty Schell, Reinholds, PA (US)

(73) Assignee: ASC ENGINEERED SOLUTIONS, LLC, Oak Brook, IL (US)

( * ) Notice: Subject to any disclaimer, the term of this patent is extended or adjusted under 35 U.S.C. 154(b) by 385 days.

(21) Appl. No.: 17/461,612

(22) Filed: Aug. 30, 2021

(65) Prior Publication Data

US 2021/0388933 A1 Dec. 16, 2021

Related U.S. Application Data

(60) Continuation of application No. 17/165,067, filed on Feb. 2, 2021, which is a division of application No.
(Continued)

(51) Int. Cl.
*B21D 39/04* (2006.01)
*F16L 13/14* (2006.01)
(Continued)

(52) U.S. Cl.
CPC .......... *F16L 43/006* (2013.01); *B21D 39/046* (2013.01); *B21D 39/048* (2013.01);
(Continued)

(58) Field of Classification Search
CPC ... B21D 39/046; B21D 39/048; F16L 39/005; F16L 39/142
See application file for complete search history.

(56) References Cited

U.S. PATENT DOCUMENTS

| 262,581 A | 8/1882 | Doolittle |
| 2,125,324 A | 8/1938 | Williams et al. |

(Continued)

FOREIGN PATENT DOCUMENTS

| CN | 2489897 Y | * | 5/2002 |
| CN | 201853977 U | * | 6/2011 |

(Continued)

OTHER PUBLICATIONS

Machine translation of JP 4070299 B2 (Year: 2008).*
(Continued)

*Primary Examiner* — Jermie E Cozart
(74) *Attorney, Agent, or Firm* — McAndrews, Held & Malloy, Ltd.

(57) ABSTRACT

A method of connecting a pipe to a cast fitting, the method can include casting a body including a first body end and a second body end disposed opposite from the first body end, wherein the body defines an axis extending from the first body end to the second body end, wherein the body includes a first neck disposed proximate to the first body end wherein the body further includes an inner body surface defining a bore extending through the body from the first body end to the second body end, and wherein the body further includes an outer body surface spaced from the inner body surface a predetermined wall thickness.

6 Claims, 21 Drawing Sheets

Related U.S. Application Data

15/852,462, filed on Dec. 22, 2017, now Pat. No. 11,060,652.

(51) Int. Cl.
*F16L 39/00* (2006.01)
*F16L 39/06* (2006.01)
*F16L 43/00* (2006.01)

(52) U.S. Cl.
CPC ............ *F16L 13/142* (2013.01); *F16L 39/005* (2013.01); *F16L 39/06* (2013.01)

(56) References Cited

U.S. PATENT DOCUMENTS

| | | | |
|---|---|---|---|
| 2,315,792 | A | 4/1943 | Hoss |
| 2,470,359 | A | 5/1949 | McLean |
| 3,204,988 | A | 9/1965 | Ouderkirk et al. |
| 3,521,913 | A | 7/1970 | Verhein |
| 4,061,367 | A | 12/1977 | Moebius |
| 4,257,155 | A | 3/1981 | Hunter |
| 4,281,856 | A | 8/1981 | Litman et al. |
| 4,541,659 | A | 9/1985 | Nakamura |
| 4,565,393 | A | 1/1986 | Greaves |
| 4,610,470 | A | 9/1986 | Perrine et al. |
| 4,635,972 | A | 1/1987 | Lyall |
| 4,893,846 | A | 1/1990 | McGraw |
| 4,936,375 | A * | 6/1990 | Harker ................ B22D 11/10 164/489 |
| 4,946,199 | A | 8/1990 | Goubeaux et al. |
| 5,421,623 | A | 6/1995 | Cassin |
| 5,566,708 | A | 10/1996 | Hobbs, Jr. |
| 5,779,285 | A | 7/1998 | Robison |
| 5,901,753 | A * | 5/1999 | Ziu ........................ F16L 39/005 138/108 |
| 6,494,493 | B1 | 12/2002 | Baruh |
| 7,594,681 | B2 | 9/2009 | Decarlo |
| 8,444,188 | B2 | 5/2013 | Pucciani |
| 8,820,794 | B1 | 9/2014 | Betz et al. |
| 8,870,237 | B2 | 10/2014 | Sindelar |
| 9,222,609 | B1 | 12/2015 | Lee |
| 11,060,652 | B2 | 7/2021 | Belen et al. |
| 2003/0155721 | A1 | 8/2003 | Zheng |
| 2005/0151369 | A1 | 7/2005 | Baruh |
| 2006/0059677 | A1 * | 3/2006 | McKay ............... F16L 33/2078 29/516 |
| 2011/0168289 | A1 | 7/2011 | Kourogi et al. |
| 2014/0054891 | A1 | 2/2014 | Ames et al. |
| 2015/0192230 | A1 * | 7/2015 | Jenkins .................. F16L 19/14 29/515 |
| 2018/0216772 | A1 | 8/2018 | Peters et al. |
| 2019/0195408 | A1 | 6/2019 | Belen et al. |
| 2021/0156502 | A1 | 5/2021 | Belen et al. |

FOREIGN PATENT DOCUMENTS

| | | | |
|---|---|---|---|
| CN | 102654223 | 9/2012 | |
| CN | 103321587 | 9/2013 | |
| CN | 203257339 | 10/2013 | |
| EP | 1039204 | 9/2000 | |
| JP | 4070299 B2 * | 4/2008 | |
| JP | 4270666 B2 * | 6/2009 | ............. F16L 21/04 |

OTHER PUBLICATIONS

Belen, Jordan Cameron; Applicant-Initiated Interview Summary for U.S. Appl. No. 15/852,462, filed Dec. 22, 2017, mailed Jun. 5, 2020, 3 pgs.

Belen, Jordan Cameron; Corrected Notice of Allowance for U.S. Appl. No. 15/852,462, filed Dec. 22, 2017, mailed Jun. 16, 2021, 6 pgs.

Belen, Jordan Cameron; Final Office Action for U.S. Appl. No. 15/852,462, filed Dec. 22, 2017, mailed Jul. 16, 2020, 7 pgs.

Belen, Jordan Cameron; Non-Final Office Action for U.S. Appl. No. 15/852,462, filed Dec. 22, 2017, mailed Oct. 29, 2020, 9 pgs.

Belen, Jordan Cameron; Non-Final Office Action for U.S. Appl. No. 15/852,462, filed Dec. 22, 2017, mailed Mar. 30, 2020, 13 pgs.

Belen, Jordan Cameron; Notice of Allowance for U.S. Appl. No. 15/852,462, filed Dec. 22, 2017, mailed Mar. 8, 2021, 8 pgs.

Belen, Jordan Cameron; Requirement for Restriction/Election for U.S. Appl. No. 15/852,462, filed Dec. 22, 2017, mailed Jan. 13, 2020, 7 pgs.

Belen, Jordan Cameron; Non-Final Office Action for U.S. Appl. No. 17/165,067, filed Feb. 2, 2021, mailed Aug. 18, 2023, 6 pgs.

Belen, Jordan Cameron; Applicant-Initiated Interview Summary for U.S. Appl. No. 17/165,067, filed Feb. 2, 2021, mailed Nov. 15, 2023, 2 pgs.

Belen, Jordan Cameron; Final Office Action for U.S. Appl. No. 17/165,067, filed Feb. 2, 2021, mailed Jan. 30, 2024, 30 pgs.

* cited by examiner

MALLEABLE PRESS FITTINGS

CROSS-REFERENCE TO RELATED APPLICATIONS

This application is a continuation of U.S. patent application Ser. No. 17/165,067, filed Feb. 2, 2021, which is a divisional of U.S. patent application Ser. No. 15/852,462, filed Dec. 22, 2017, which issued into U.S. Pat. No. 11,060,652 on Jul. 13, 2021, which are each hereby incorporated in their entirety by reference.

TECHNICAL FIELD

This disclosure relates to pipe fittings. More specifically, this disclosure relates to cast pipe fittings that can be press fit onto a pipe.

BACKGROUND

Pipe fittings are commonly used to connect two pipe lengths together to form a pipe connection, such as when installing a pipe system or pipe infrastructure. Some pipe fittings can be time consuming or difficult to install. For example, some stab-in couplings require a pipe length to be stabbed into a socket. Some other pipe fittings require tightening of numerous bolts positioned around the pipe fitting. The bolts typically must be tightened in a pattern, such as a star pattern, to ensure that pressure from the bolts is evenly distributed over the pipe connection assembly to provide for a reliable and uniform seal. Additionally, many cast pipe fittings can be of poor structural integrity. If the defect in the casting is found early, these poor fittings can be repoured at the foundry. If the defect is not found early, the fitting can fail in use which can be dangerous and costly.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a cast body for a pipe fitting, the cast body comprising: a first body end and a second body end disposed opposite from the first body end, the body defining an axis extending from the first body end to the second body end, an inner body surface defining a fitting bore extending through the body from the first body end to the second body end; and an outer body surface spaced from the inner body surface at a predetermined wall thickness, wherein at a first location on the axis, the inner body surface is a first distance from the axis, wherein at a second location on the axis that is spaced from the first location and proximate to the first body end, the inner body surface is a second distance from the axis that is greater than the first distance, wherein at the first location, the outer body surface is a third distance from the axis, and wherein at the second location, the outer body surface is a fourth distance from the axis that is less than the third distance.

Also disclosed is a pipe connection assembly comprising: a fitting comprising: a cast body comprising a first body end and a second body end disposed opposite from the first body end, wherein the body defines an axis extending from the first body end to the second body end, wherein the body further comprises an inner body surface defining a fitting bore extending through the body from the first body end to the second body end, wherein the body further comprises an outer body surface spaced from the inner body surface a predetermined wall thickness, and wherein a seal cavity is defined in a portion of the fitting bore, wherein at a first location on the axis, the inner body surface is a first distance from the axis and at a second location on the axis that is spaced from the first location, the inner body surface is a second distance from the axis that is greater than the first distance, and wherein at the first location, the outer body surface is a third distance from the axis and at the second location, the outer body surface is a fourth distance from the axis that is less than the third distance; at least one of a seal, a spacer, and a grip ring positioned in the seal cavity; and a pipe length having a pipe end insertable into the fitting bore.

Also disclosed is a method of connecting a pipe to a cast fitting, the method comprising: casting a body comprising: a first body end and a second body end disposed opposite from the first body end, wherein the body defines an axis extending from the first body end to the second body end, wherein the body comprises a first neck disposed proximate to the first body end, wherein the body further comprises an inner body surface defining a bore extending through the body from the first body end to the second body end, and wherein the body further comprises an outer body surface spaced from the inner body surface a predetermined wall thickness, wherein at a first location on the axis, the inner body surface is a first distance from the axis and at a second location on the axis that is spaced from the first location, the inner body surface is a second distance from the axis that is greater than the first distance, and wherein at the first location, the outer body surface is a third distance from the axis and at the second location, the outer body surface is a fourth distance from the axis that is less than the third distance.

Also disclosed is an unmachined cast body for a pipe fitting, the cast body comprising a first body end and a second body end disposed opposite from the first body end, the cast body defining an axis extending from the first body end to the second body end, the cast body defining a midpoint between first body end and the second body end, a centerline of the cast body defined at the midpoint perpendicular to the axis, a first distance from the centerline to the first body end being equal to a second distance from the centerline to the second body end, an inner body surface defining a fitting bore extending through the cast body from the first body end to the second body end, and an outer body surface spaced from the inner body surface, the outer body surface defining a first frustoconical shape and a second frustoconical shape, the first frustoconical shape intersecting the second frustoconical shape at the centerline, the outer body surface defining a groove between the centerline and the first body end, the first frustoconical shape extending between the centerline and the groove, the first frustoconical shape tapering inwards towards the axis as the first frustoconical shape extends from the centerline towards the groove, the cast body comprising a neck extending from the groove to the first body end, a portion of the outer body surface defined by the neck defining a cylindrical surface, the second frustoconical shape defined between the centerline and the second body end, the second frustoconical shape tapering inwards towards the axis as the second frustoconical shape extends towards the second body end, and wherein the inner body surface tapers inward toward the axis from the first body end.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
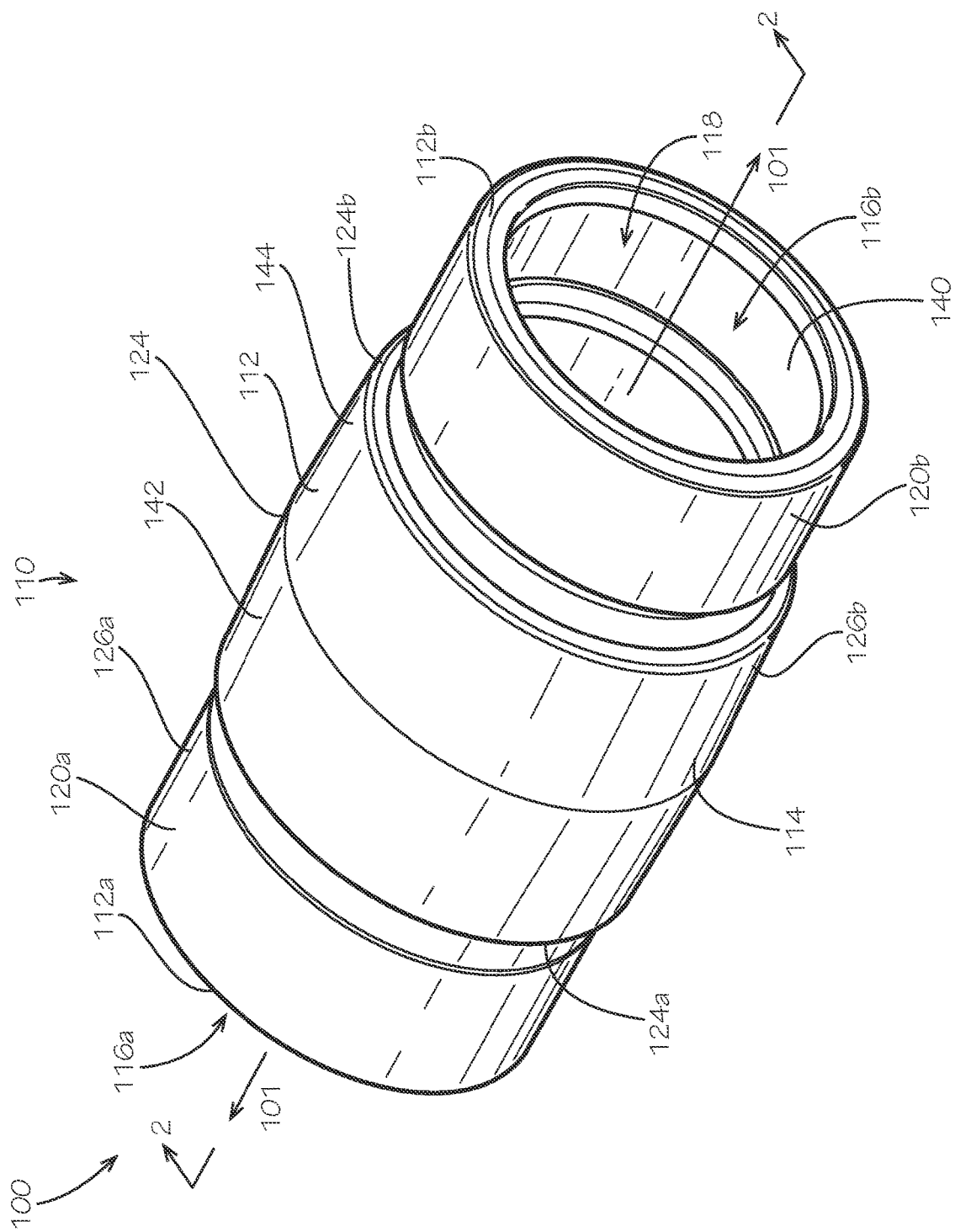
FIG. 1 is a perspective view of a cast fitting in which the fitting is a coupling in accordance with one aspect of the present disclosure, the fitting comprising a cast body.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed are malleable press fittings and associated methods, systems, devices, and various apparatus. The malleable press fitting can be a cast fitting comprising a body defining at least one body bore configured to receive a portion of a pipe therein. A body wall of the body can be a tapered wall such that a wall thickness of the body wall varies. The malleable press fitting can be a coupling, an elbow, a union, a nipple, a reducer, a tee, a cross, a cap, an adapter and the like. In one aspect, the malleable press fitting can be a metallic fitting comprising a ferrous material and formed from, for example and without limitation, cast iron, ductile iron, and the like. In other aspects, the malleable press fitting can be a polymeric fitting formed from, for example and without limitation, nylon, ABS, PVC, and the like. It would be understood by one of skill in the art that the disclosed malleable press fittings are described in but a few exemplary embodiments among many. No particular terminology or description should be considered limiting on the disclosure or the scope of any claims issuing therefrom.

FIG. 1 shows a perspective view of a malleable press cast fitting 100 in which the fitting is a coupling 110, according to one aspect. The fitting 100 can comprise a cast body 112 having a first body end 112a and a second body end 112b. The first body end 112a can be disposed opposite from the second body end 112b, and the body 112 can define an axis 101 extending from the first body end 112a to the second body end 112b. Unless otherwise stated, all descriptions of radial and axial directions as used herein are relative to the axis 101 of the fitting 100. The body 112 can comprise a first neck 120a disposed proximate to the first body end 112a, a second neck 120b disposed proximate to the second body end 112b, and a center portion 114 disposed between the first neck 120a and the second neck 120b. The body 112 can define a first shoulder 124a between the center portion 114 and the first neck 120a and a second shoulder 124b between the center portion and the second neck 120b. Each of the shoulders 124a,b can extend radially inward from the center portion 114 to the adjacent neck 120a,b with respect to the axis 101.

The cast body 112 can define an inner body surface 140 and an outer body surface 142 spaced from the inner body surface 140 at a predetermined body thickness. In one aspect, the predetermined body thickness can be the thickness of a wall 144 of the fitting. The inner body surface 140 can define a fitting bore 118 extending through the body 112 from the first body end 112a to the second body end 112b. The fitting bore 118 can define a first bore opening 116a (shown in FIG. 2) at the first body end 112a and a second bore opening 116b at the second body end 112b. In the present aspect, the fitting body 112 can define a centerline 124 disposed substantially at a midpoint between the first body end 112a and the second body end 112b. The centerline 124 can divide the body 112 into a first portion 126a defined between the centerline 124 and the first body end 112a and a second portion 126b defined between the centerline 124 and the second body end 112b. In one aspect, the body 112 can be symmetric with respect to the centerline 124 such that the first portion 126a is substantially a mirror image of the second portion 126b. Alternatively, in other aspects, the body 112 can be asymmetric with respect to the centerline 124 such that the first portion 126a is different than the second portion 126b.

Figure 2:
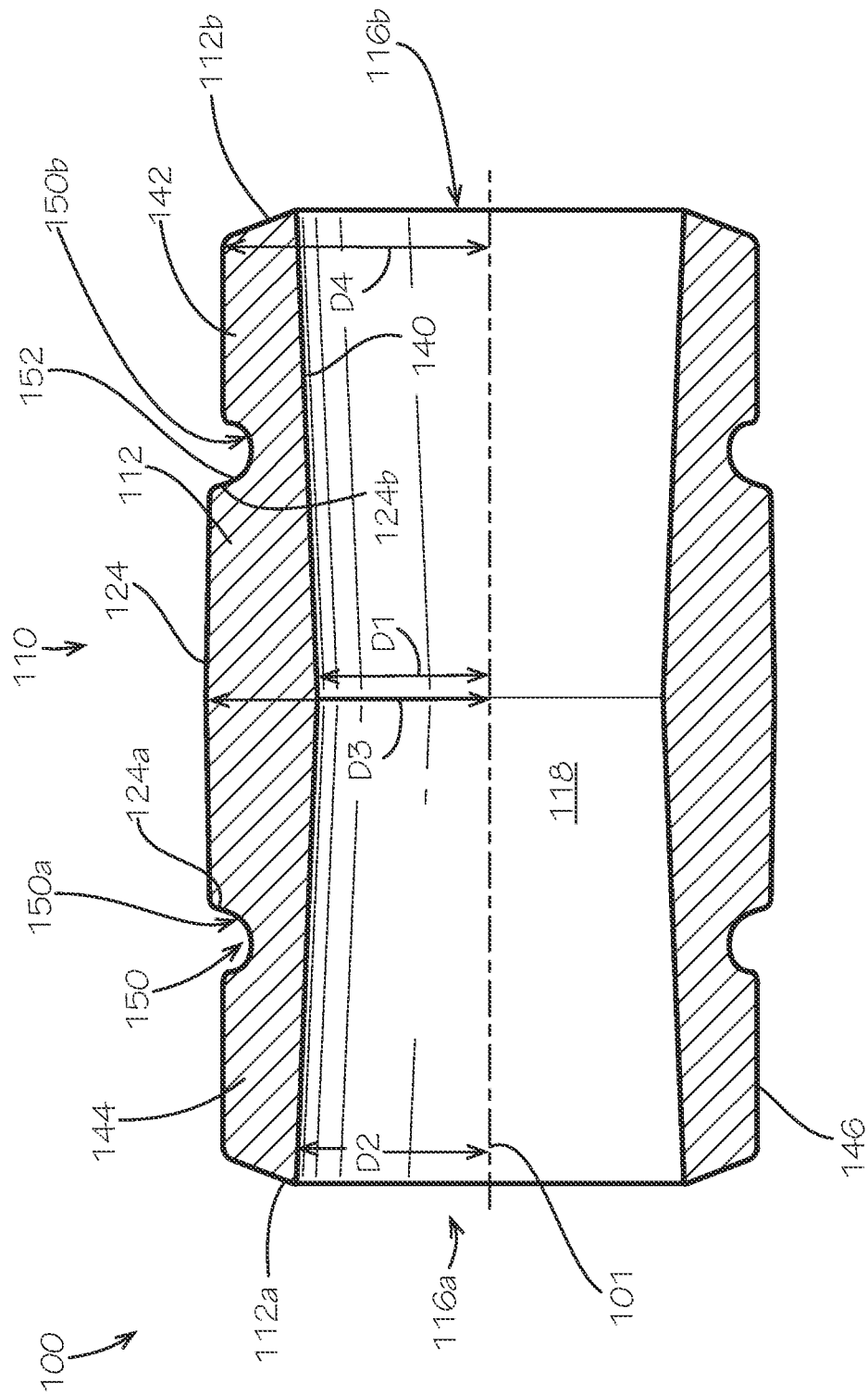
FIG. 2 is a cross-sectional view of the cast fitting of FIG. 1 taken along line 2-2 shown in FIG. 1.

FIG. 2 is a cross-sectional view of the malleable press cast fitting 100 of FIG. 1 taken along line 2-2 shown in FIG. 1. In one aspect, the inner body surface 140 can taper or slope from the centerline 124 towards the first body end 112a and the second body end 112b. In another aspect, at the centerline 124, the inner body surface 140 can be a first distance D1 from the axis 101, and at the first body end 112a and/or the second body end 112b, the inner body surface can be a second distance D2 from the axis that is greater than the first distance. That is, prior to machining of the casting 146 (i.e., the cast body 112), the diameter of the first bore opening 116a and the second bore opening 116b can be greater than the diameter of the bore 118 at a position between the first bore opening and the second bore opening, such as, for example, at the centerline 124. In another aspect, at least a portion of the inner body surface can be at an acute angle relative to the axis 101. For example, at least a portion of the inner body surface extending between the first body end 112a and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the axis 101. In another example, at least a portion of the inner body surface 140 extending between the second body end 112b and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the axis 101.

As illustrated in FIG. 2, the taper or slope of the inner body surface 140 from the centerline 124 towards each of the first body end 112a and the second body end 112b can be substantially constant such that at least a portion of the inner body surface is substantially linear in cross-section from the centerline 124 to the first body end 112a and from the centerline to the second body end 112b. Thus, in the present aspect, the inner body surface 140 can define a first frustoconical shape that tapers from the first body end 112a towards the centerline and a second frustoconical shape that tapers from the second body end 112b towards the centerline. Alternatively, in other aspects, the slope of the inner body surface 140 from the centerline 124 towards each of the first body end 112a and the second body end 112b need not be substantially constant such that a portion of the inner body surface from the first body end to the centerline can have a different slope than at least one other portion of the inner body surface 140 from the first body end 112a to the centerline. Optionally, at least a portion of the taper of the inner body surface 140 can be arcuate when viewed in cross-section. For example, at least a portion of the taper of the inner body surface 140 from the centerline 124 towards either of the first body end 112a and the second body end 112b can be arcuate when viewed in cross-section.

In one aspect, the outer body surface 142 can taper from the centerline 124 towards the first body end 112a and the second body end 112b. In another aspect, at the centerline 124, the outer body surface can be a third distance D3 from the axis 101, and at the first body end 112a and/or the second body end 112b, the inner body surface can be a fourth distance D4 from the axis that is less than the third distance. That is, prior to machining of the casting 146 (i.e., the cast body 112), the outer diameter of the body 112 can be smaller at the first bore opening 116a and the second bore opening 116b than at a position between the first bore opening and the second bore opening, such as, for example, at the centerline 124. In another aspect, at least a portion of the outer body surface can be at an acute angle relative to the axis 101. For example, at least a portion of the outer body surface extending between the first body end 112a and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the axis 101. In another example, at least a portion of the outer body surface 140 extending between the second body end 112b and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the axis 101.

As illustrated in FIG. 2, the taper or slope of the outer body surface 142 from the centerline 124 towards each of the first body end 112a and the second body end 112b can be substantially constant such that the outer body surface is substantially linear in cross-section from the centerline 124 to the first body end 112a and from the centerline to the second body end 112b. Thus, in the present aspect, the outer body surface 142 can define a first frustoconical shape that tapers from the centerline towards the first body end 112a and a second frustoconical shape that tapers from the centerline towards the second body end 112b. Alternatively, in other aspects, the slope from the centerline 124 towards each of the first body end 112a and the second body end 112b need not be substantially constant such that a portion of the outer body surface 142 from the first body end to the centerline can have a different slope than at least one other portion of the outer body surface from the first body end 112a to the centerline. Optionally, at least a portion of the taper of the outer body surface 142 from the centerline towards each of the first body end 112a and the second body end 112b can be arcuate when viewed in cross-section.

In one aspect (not shown), the inner body surface 140 can taper or slope from the first body end 112a and the second body end 112b towards the centerline. In another aspect, at the centerline 124, the inner body surface 140 can be a first distance from the axis 101, and at the first body end 112a and/or the second body end 112b, the inner body surface can be a second distance from the axis that is less than the first distance. That is, the diameter of the first bore opening 116a and the second bore opening 116b can be less than the diameter of the bore 118 at the centerline 124. Thus, in the present aspect, the inner body surface 140 can define a first frustoconical shape that tapers from the centerline towards the first body end 112a and a second frustoconical shape that tapers from the centerline towards the second body end 112b.

In another aspect (not shown), the outer body surface 142 can taper from the first body end 112a and the second body end 112b towards the centerline 124. That is, at the centerline 124, the outer body surface can be a third distance from the axis 101, and at the first body end 112a and/or the second body end 112b, the inner body surface can be a fourth distance from the axis that is greater than the third distance. Thus, the outer diameter of the body 112 can be less at the centerline 124 than the outer diameter of the body at the first body end 112a and the second body end 112b. In the present aspect, the outer body surface 140 can define a first frustoconical shape that tapers from the first body end 112a towards the centerline, and a second frustoconical shape that tapers from the second body end 112b towards the centerline.

The inner body surface 140 and/or the outer body surface 142 need not slope for the entire distance from the centerline 124 towards the body ends 112a,b. In one aspect, at a first location anywhere on the cast body 112, the inner body surface can be the first distance D1 from the axis 101 and at a second location on the body that is spaced from the first location, the inner body surface 140 can be the second distance D2 from the axis that is greater than the first distance, and at the first location, the outer body surface can be the third distance D3 from the axis 101 and at the second location, the outer body surface 142 can the fourth distance D4 from the axis that is less than the third distance. That is, in one aspect, the inner body surface can taper towards the outer body surface, and the outer body surface 142 can taper towards the inner body surface 140 at any predetermined first and second positions on the fitting. In another aspect, the amount of slope of the inner body surface 140 and the amount of slope of the outer body surface 142 can be different at different portions of the fitting 100. For example, the slope of the inner body surface and the outer body surface relative to the axis 101 can be different at the first portion 126a of the fitting than the slope of the inner body surface 140 and the outer body surface 142 relative to the axis at the second portion 126b.

In one aspect, the body 112 of the fitting 100 can be a cast body. In another aspect, the distance between the inner body surface 140 and the outer body surface 142 (i.e., the thickness of the fitting wall 144) can be configured in a manner controlling the solidification of the molten metal during the casting process of the body 112. In a further aspect, the taper of the inner body surface 140 and the outer body surface 142 can be configured in a manner controlling the solidification of the molten metal and yielding a sound cast fitting that meets a predetermined set of material properties. In a further aspect, during the casting process, the thicker portions of the wall 144 can be configured to form a reservoir of molten metal such that thinner portions of the wall 144 can draw molten metal from the reservoir during the solidification process. This reservoir can provide the additional liquid metal required to feed thinner portions of the wall 144, thus controlling the solidification of the fitting 100 during the casting process and yielding a sound cast fitting.

For example, if the inner body surface 140 and/or the outer body surface 142 taper from the centerline 124 towards the first body end 112a and the second body end 112b, the wall 144 of the fitting can be relatively thinner adjacent the first body end 112a and the second body end 112b than a relatively thicker wall thickness adjacent the centerline. In one aspect, liquid metal can be poured into the mold through a feeder tube in fluid communication with the thicker wall portion of the fitting 100 adjacent the centerline 124. As liquid metal is poured into the mold, the thinner wall portion can cool quicker than the relatively thicker wall portion adjacent the centerline. Because solid metal takes up less space in the mold than liquid metal, as this liquid metal solidifies in thinner portions of the wall 144 adjacent the first body end 112a and the second body end 112b, more liquid metal can be pulled from thicker portions of the wall adjacent the centerline, and thus, solidification of the metal used to form the fitting can be controlled.

In another example, if the inner body surface 140 and/or the outer body surface 142 taper from the first body end 112a and the second body end 112b towards the centerline 124, the wall 144 of the fitting can be relatively thicker adjacent the first body end 112a and the second body end 112b than a relatively thinner wall thickness adjacent the centerline. In one aspect, liquid metal can be poured into the mold through at least one feeder tube in fluid communication with the thicker wall portion of the fitting 100 adjacent the first body end 112a and the second body end 112b. As liquid metal is poured into the mold, the thinner wall portion adjacent the centerline 124 can cool more quickly than the relatively thicker wall portion adjacent the first body end and the second body end. Because solid metal takes up less space in the mold than liquid metal, as this liquid metal solidifies in thinner portions of the wall 144 adjacent the centerline 124, more liquid metal can be pulled from thicker portions of the wall adjacent the first body end 112a and the second body end 112b, and thus, solidification of the metal used to form the fitting can be controlled.

Still with reference to FIG. 2, at least one groove 150 can be defined in the outer body surface 142 of the fitting 100 by a groove surface 152 positioned at least partially in the wall 144 of the fitting. In one aspect, the at least one groove can comprise a plurality of grooves 150, such that a first groove 150a is positioned between the centerline 124 and the first body end 112a, and a second groove 150b is positioned between the centerline and the second body end 112b. In another aspect, at least a portion of the grove surface of the first groove can form a portion of the first shoulder 124a, and at least a portion of the groove surface 152 of the second groove can form a portion of the second shoulder 124b.

Figure 3:
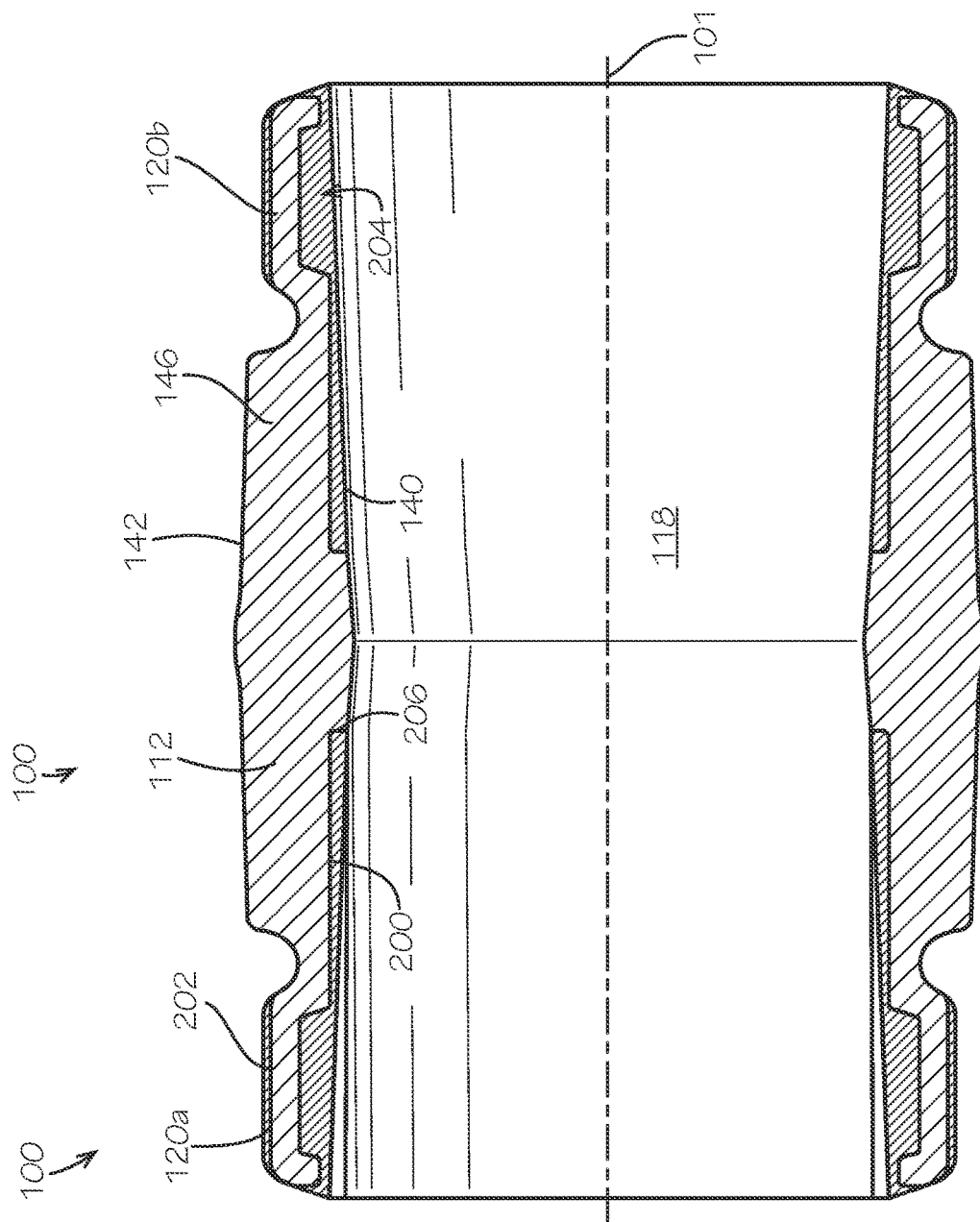
FIG. 3 is a cross-sectional view of the cast fitting of FIG. 1 showing portions of the cast fitting that can be machined away to form a machined fitting.
Figure 4:
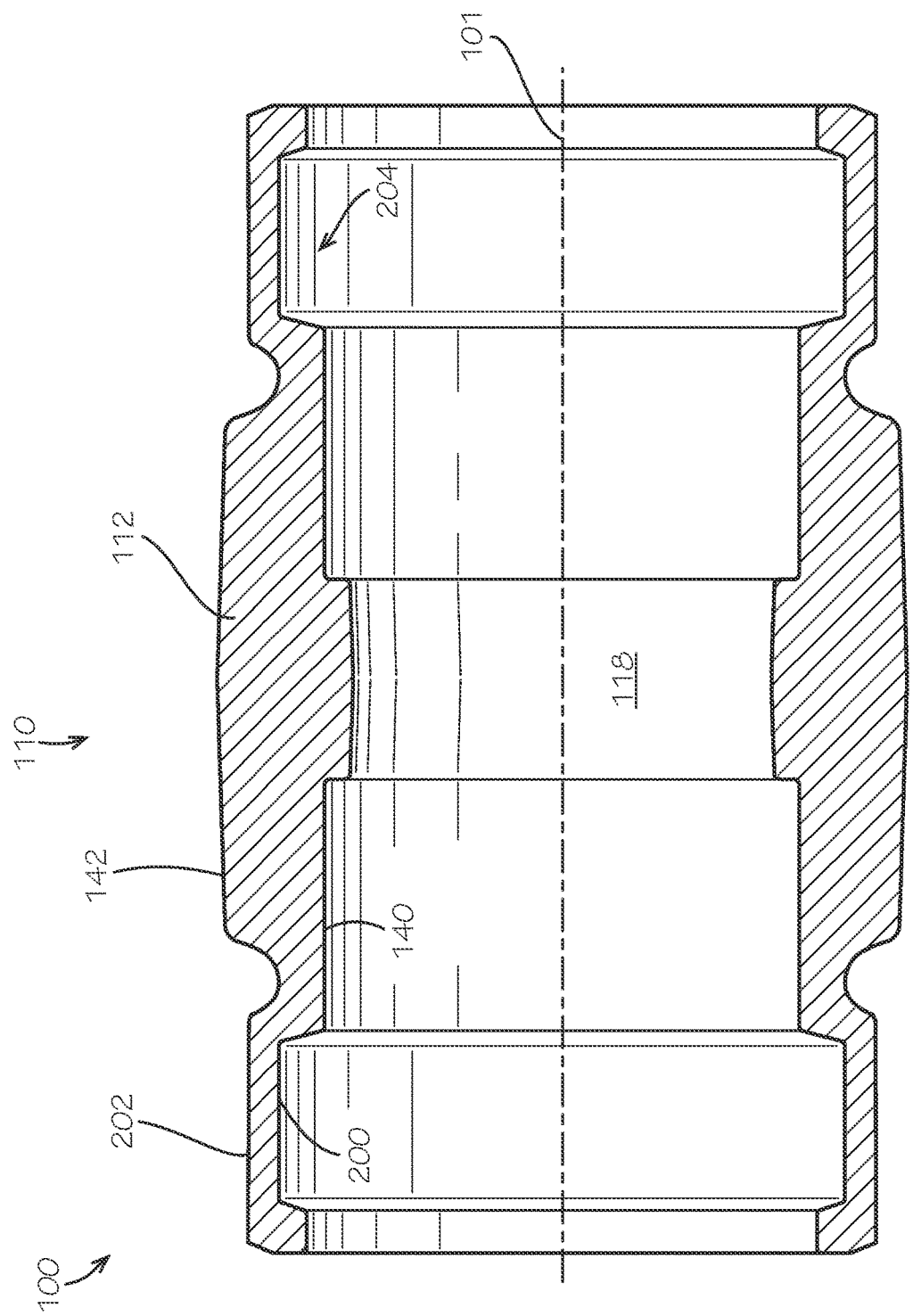
FIG. 4 is a cross-sectional view of the cast fitting of FIG. 1 after machining portions of the cast fitting to form a machined fitting.

FIG. 3 is a cross-sectional view of the cast body 112 of FIG. 2 showing portions of the cast body 112 that can be machined off to form the machined fitting 100, according to one aspect. In this aspect, portions of the tapered inner body surface 140 can be machined away so that, as shown in FIG. 3, a machined wall 200 of the bore 118 can be substantially parallel to the axis 101 of the fitting. In this aspect, a step 206 can be formed that is positioned between the machined wall and the unmachined portion of the inner body surface 140. In another aspect, portions of the outer body surface 142 can be machined away so that a machined jaw engagement surface 202 can be formed on the first neck 120a and the second neck 120b. In still another aspect, portions of the inner body surface 142 can be machined away so that a seal cavity 204 can be defined in portions of the first neck 120a and the second neck 120b. FIG. 4 is a cross-sectional view of the cast body 112 of FIG. 2 after machining to form the machined fitting 100.

Figure 5:
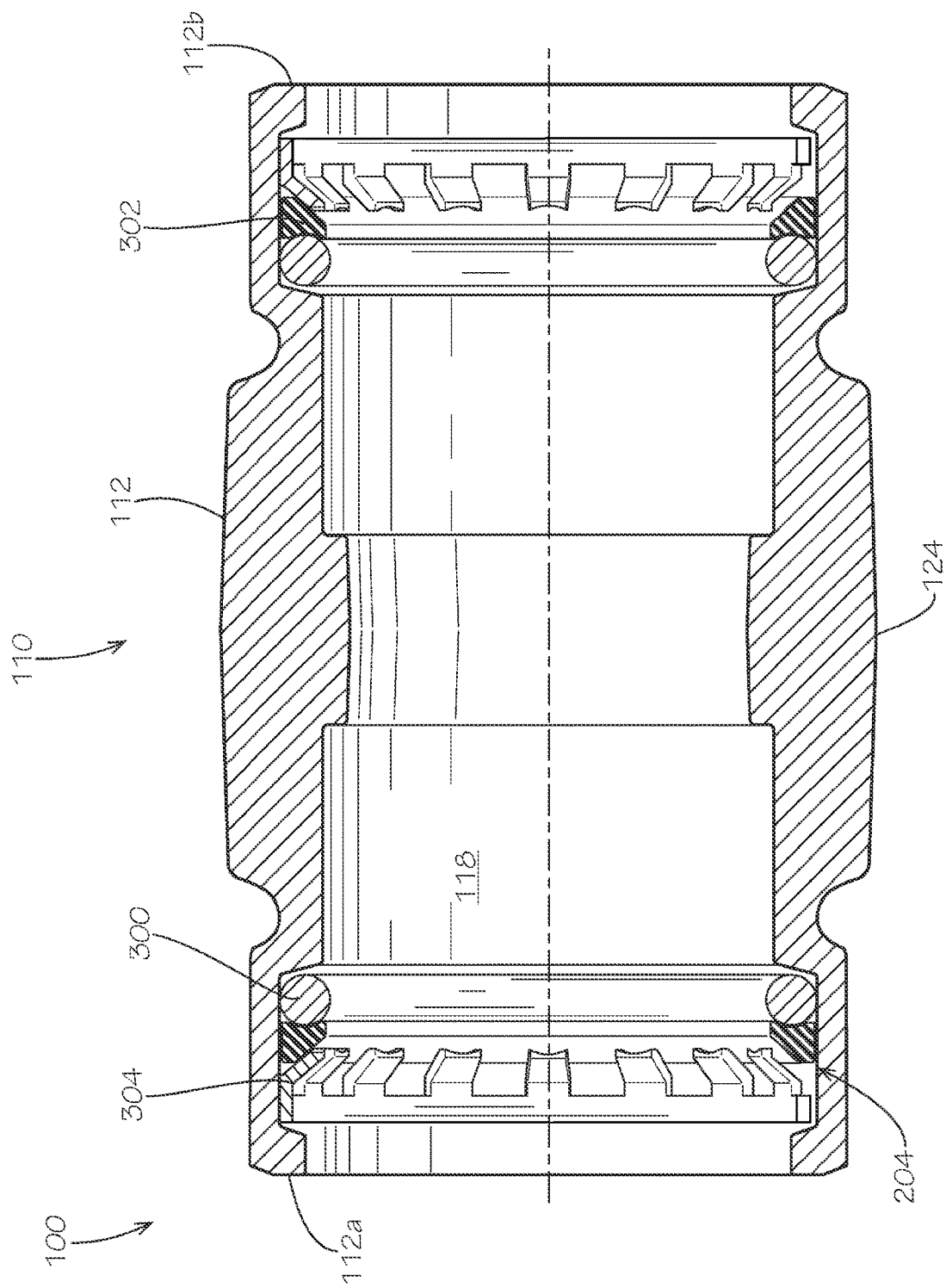
FIG. 5 is a cross-sectional view of the machined fitting of FIG. 4 in which seal elements have been positioned in a seal cavity defined in the body of the fitting to form a fitting assembly.

FIG. 5 is a cross-sectional view of the machined fitting 100 of FIG. 4 with seal elements installed to form a fitting assembly. In one aspect, the seal elements can comprise at least one of a seal 300, such as an O-ring and the like, a spacer 302 and a grip ring 304. In use, described more fully below, the seal 300 can form a seal between the fitting 100 and a pipe inserted into the bore 118 of the fitting. The grip ring 304 can have a plurality of teeth configured to engage a portion of the pipe to prevent or restrict inadvertent removal of the pipe from the bore. The spacer 302 can be positioned between the seal 300 and the grip ring 304 to prevent or restrict inadvertent contact between the seal 300 and the grip ring 304. For example, the seal 300 can be inserted into the seal cavity 204 of the body closest to the centerline 124 of the body 112 and the grip ring 304 can be inserted into the seal cavity closest to the first end 112a or the second end 112b of the body 112. The spacer 302 can be positioned in the seal cavity 204 between the seal and the grip ring.

Figure 6:
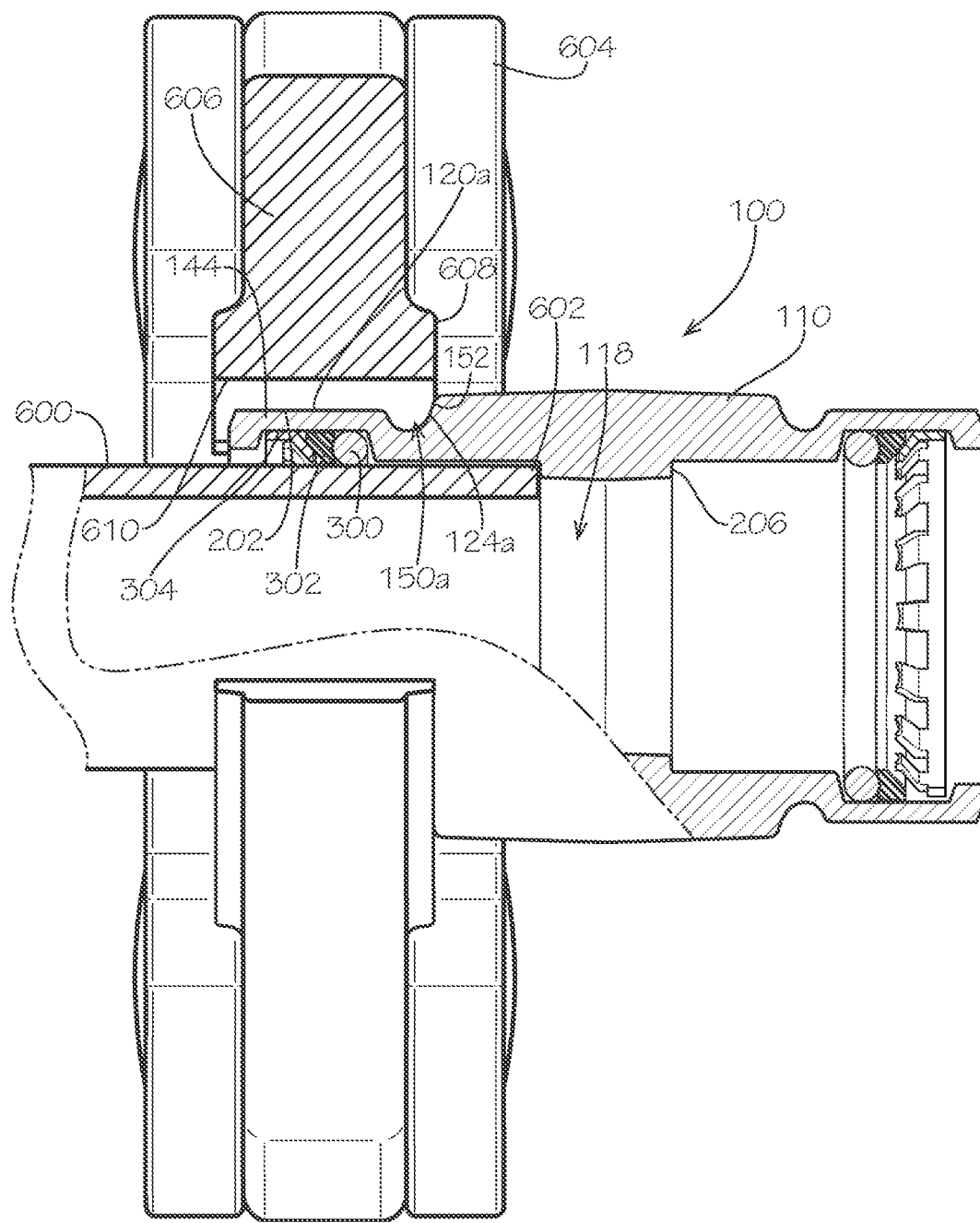
FIG. 6 is a partial cross-section view of the fitting assembly of FIG. 5, also showing a press having a jaw in a first position relative to the fitting assembly.
Figure 7:
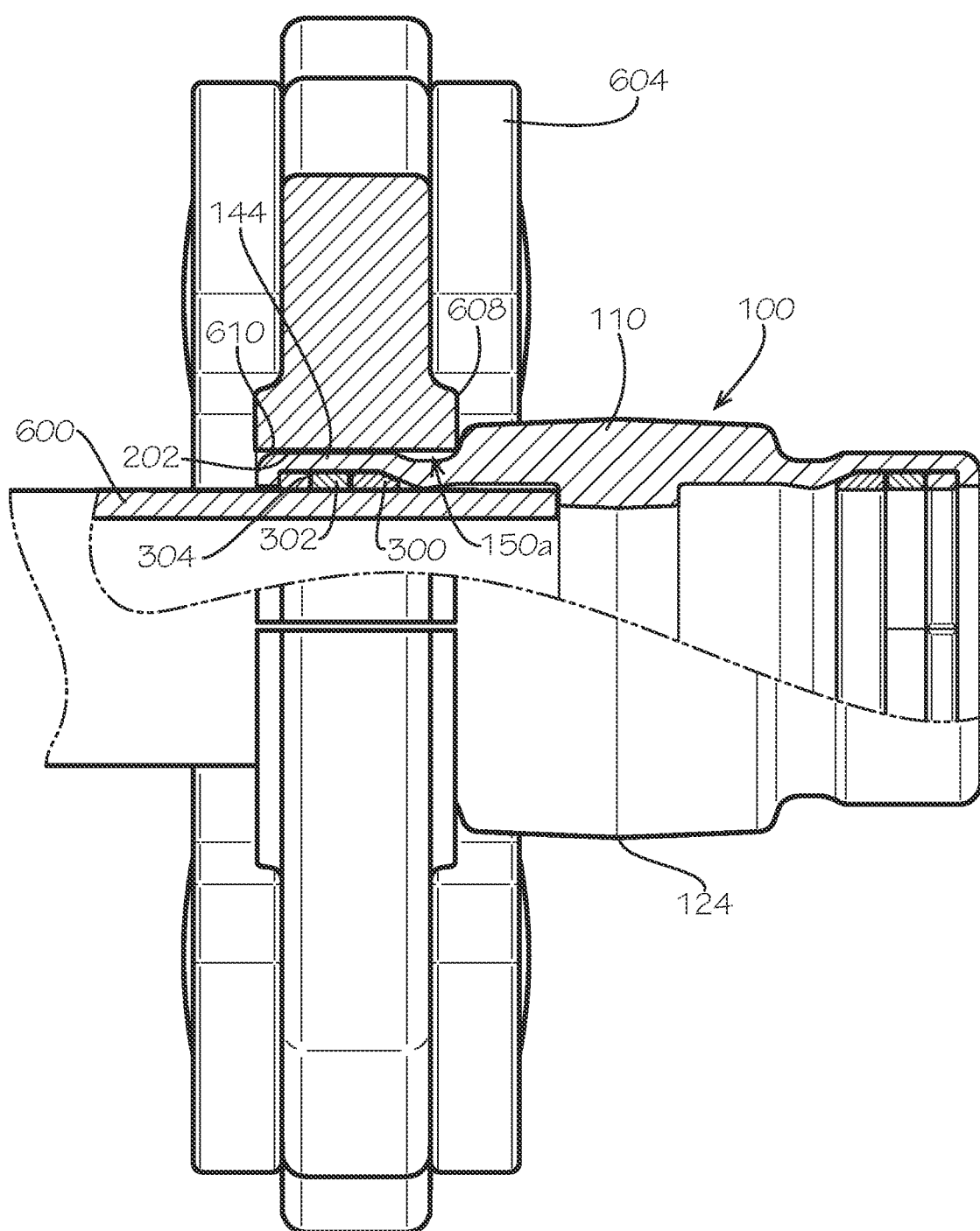
FIG. 7 is a partial cross-section view of the fitting assembly of FIG. 5, also showing a press having a jaw in a second position relative to the fitting assembly.

FIGS. 6 and 7 illustrate placement and securement of the first portion 126a of the fitting assembly to a pipe 600, according to one aspect. In use, an end 602 of the pipe can be inserted into the bore 118 of the fitting 100. In one aspect, the end of the pipe 600 can be inserted through the first bore opening 116a until the end 602 contacts the step 206, which can prevent the pipe 600 from being inserted any further. A press 604 can be positioned around the first portion 126a so that a jaw 606 of the press 604 is positioned around at least a portion of the jaw engagement surface 202 of the first neck 120a. In one aspect, a side edge 608 of the jaw 606 can be substantially aligned with a portion of the groove surface 152 of the first groove 150a (i.e., the portion of the grove surface that forms the first shoulder 124a) so that the jaw 606 is in a desired position relative to the fitting 100. With the jaw 606 in the desired position, the jaw 606 can be moved about and between a first position, in which a lower edge 610 of the jaw is spaced from the jaw engagement surface 202 of the fitting (as illustrated in FIG. 6), and a second position, in which the jaw 606 contacts the jaw engagement surface 202 and urges the jaw engagement surface 202 towards the bore 118 (as illustrated in FIG. 7).

In the second position, according to one aspect, the neck 120a of the fitting 100 can be compressed so that the thickness of the wall 144 of the neck 120a is less in the second position than the thickness of the wall of the neck 120a before compression. This can cause a width of the neck to increase in the second position. For example, when compressed by the jaw 606, portions of the wall 144 of the neck 120a can be urged outward towards the ends of the fitting 100. Similarly, when compressed by the jaw, portions of the wall of the neck 120a can be urged inward towards the centerline 124 and/or into the groove 150a. In the second position, compression of the neck 120a can urge the seal 300 into a fluid-tight seal relative to the pipe 600. Further, in the second position, at least a portion of the body 112 can be urged into contact with the pipe 600.

To secure a pipe 600 to the second portion 126b of the fitting 100, the end 602 of the pipe 600 can be inserted through the second bore opening 116b until the end contacts the step 206, which can prevent the pipe 600 from being inserted any further. The press 604 can be positioned around the second portion 126b so that the jaw 606 of the press 604 is positioned around at least a portion of the jaw engagement surface 202 of the second neck 120b. In one aspect, the side edge 608 of the jaw 606 can be substantially aligned with a portion of the groove surface 152 of the second groove 150b (i.e., the portion of the grove surface that forms the second shoulder 124b) so that the jaw 606 is in a desired position relative to the fitting. With the jaw 606 in the desired position, the jaw 606 can be moved about and between the first position, in which a lower edge 610 of the jaw 606 is spaced from the jaw engagement surface 202 of the fitting 100, and the second position, in which the jaw 606 contacts the jaw engagement surface 202 and urges the jaw engagement surface 202 towards the bore 118.

Figure 8:
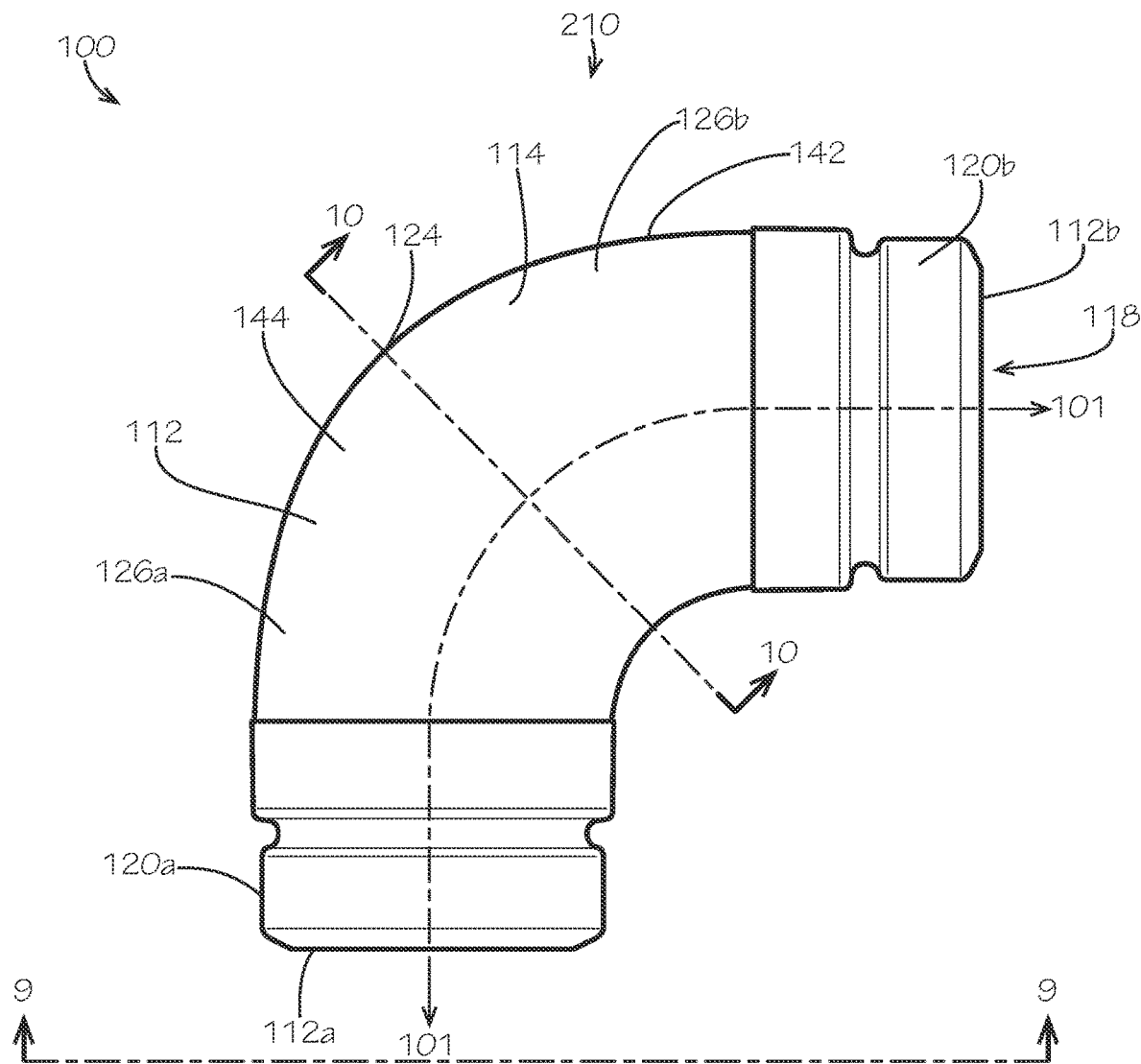
FIG. 8 is an elevational view of a cast fitting in which the fitting is an elbow in accordance with one aspect of the present disclosure.
Figure 9A:
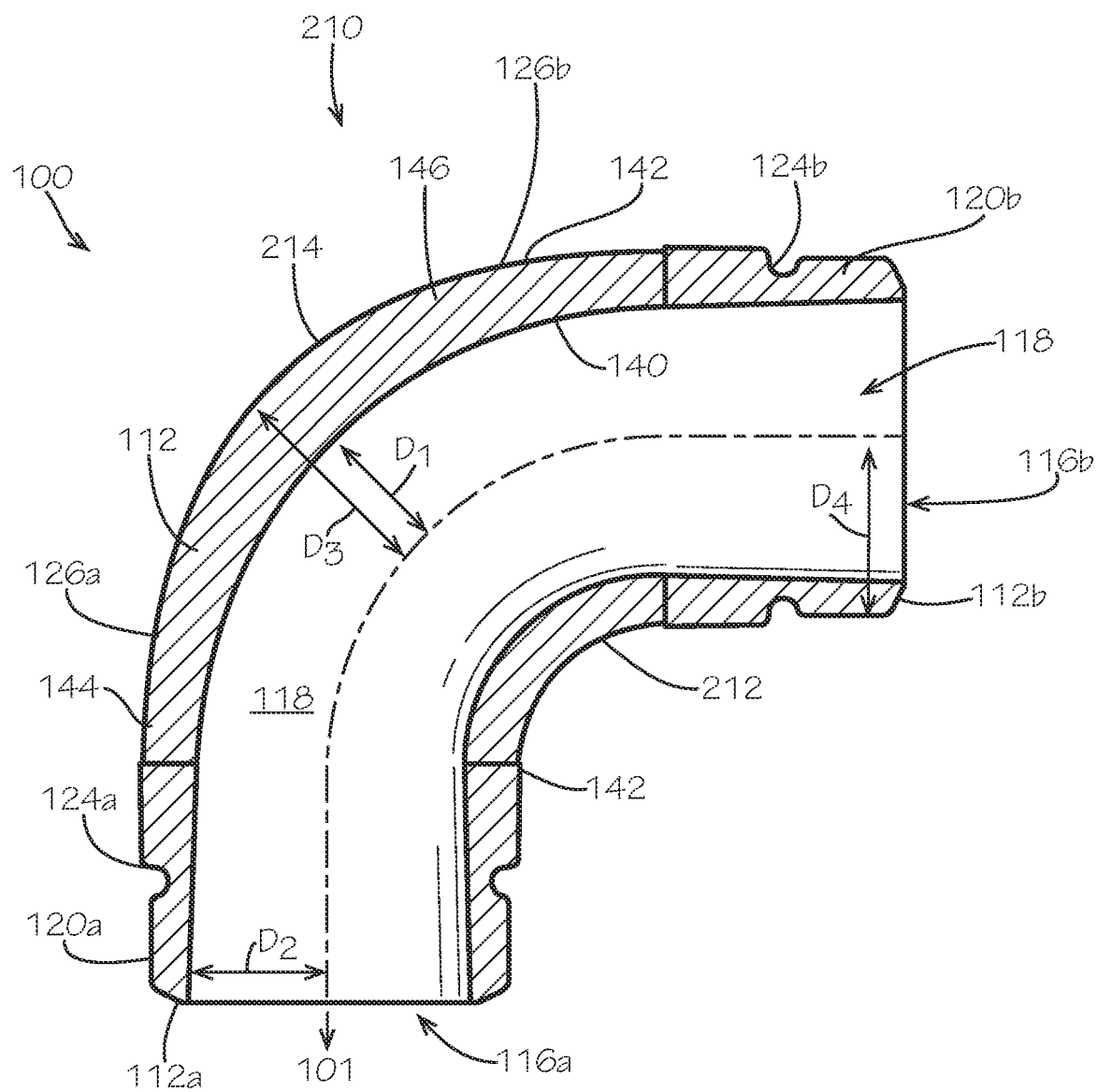
FIG. 9A is a cross-sectional view of the cast fitting of FIG. 8 taken along line 9-9 shown in FIG. 8.
Figure 9B:
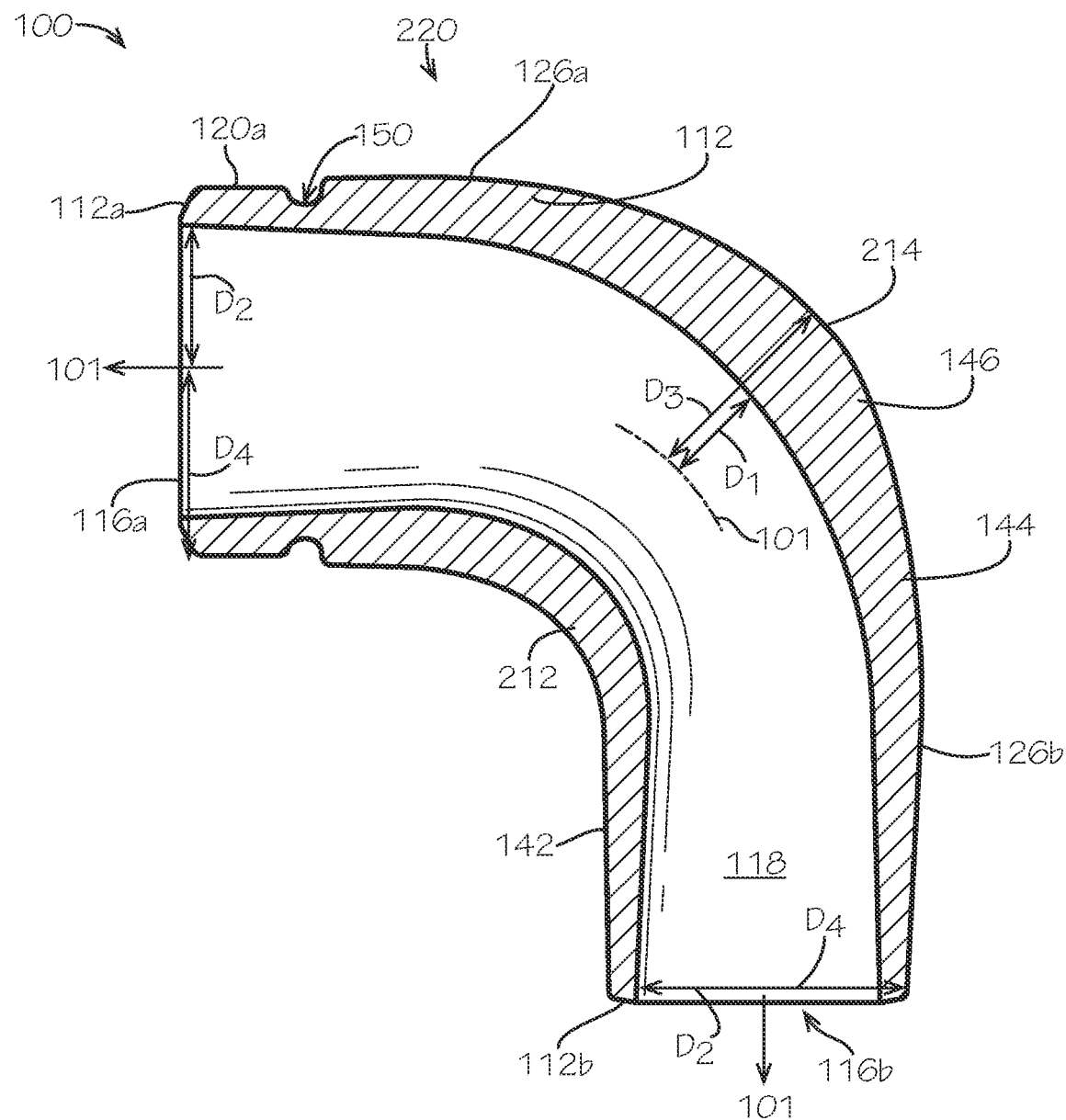
FIG. 9B is a cross-sectional view of a cast fitting in which the fitting is a street elbow.
Figure 9C:
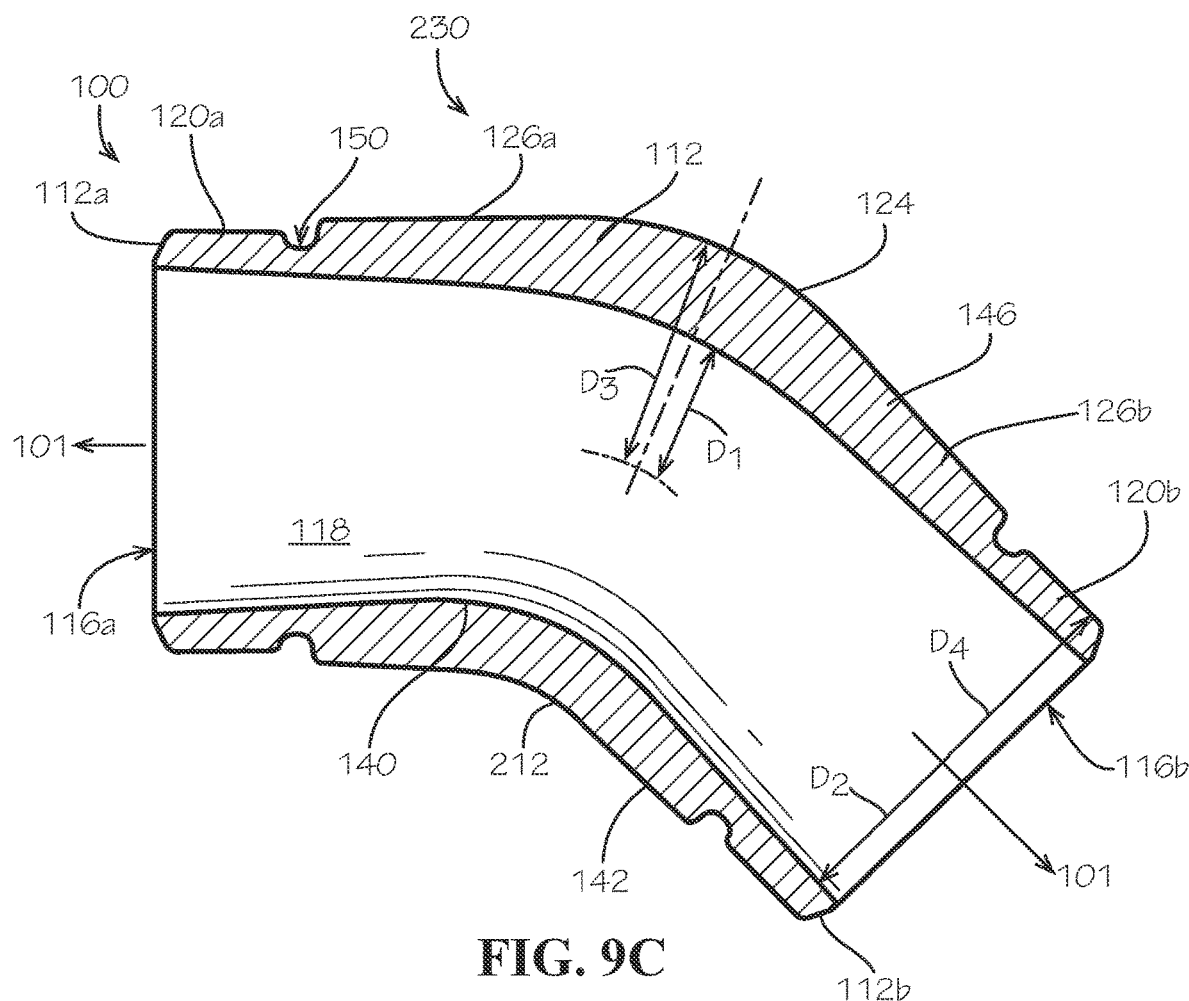
FIG. 9C is a cross-sectional view of a cast fitting in which the fitting is a 45 degree elbow.
Figure 10:
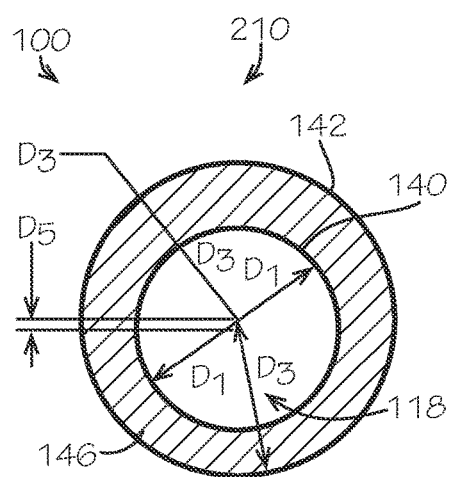
FIG. 10 is a cross-sectional view of the cast fitting of FIG. 8 taken along line 10-10 shown in FIG. 8.

While the above description of the fitting 100 has been made with reference to a coupling 110, the fitting 100 can comprise an elbow 210 as illustrated in FIGS. 8-10. In one aspect, the elbow 210 can comprise the cast body 112 having the first body end 112a and the second body end 112b disposed opposite from the second body end 112b. The body 112 can define the axis 101 extending from the first body end 112a to the second body end 112b. In one aspect, at least a portion of the axis 101 of the elbow 210 can be an arcuate axis. For example, the portion of the axis 101 adjacent the first body end 112a can be at an axis angle of about 90 degrees relative to portion of the axis adjacent the second body end 112b. Unless otherwise stated, all descriptions of radial and axial directions as used herein are relative to the axis 101 of the fitting. The body 112 can comprise the first neck 120a disposed proximate to the first body end 112a, the second neck 120b disposed proximate to the second body end 112b, and the center portion 114 disposed between the first neck 120a and the second neck 120b. The body 112 can define the first shoulder 124a between the center portion 114 and the first neck 120a and the second shoulder 124b between the center portion and the second neck 120b. Each of the shoulders 124a,b can extend radially inward from the body 112 to the adjacent neck 120a,b with respect to the axis 101.

The cast body 112 of the elbow 210 can define the inner body surface 140 and the outer body surface 142 spaced from the inner body surface a predetermined body thickness. In one aspect, the predetermined body thickness can be the thickness of the wall 144 of the elbow. The inner body surface 140 can define the fitting bore 118 extending through the body 112 from the first body end 112a to the second body end 112b. The fitting bore 118 can define the first bore opening 116a at the first body end 112a and the second bore opening 116b at the second body end 112b.

In the present aspect, the cast body 112 can define the centerline 124 disposed substantially at a midpoint between the first body end 112a and the second body end 112b. The centerline 124 can divide the body 112 into the first portion 126a defined between the centerline 124 and the first body end 112a and the second portion 126b defined between the centerline 124 and the second body end 112b.

FIG. 9a is a cross-sectional view of the cast body 112 of the elbow 210 of FIG. 8 taken along line 9-9 shown in FIG. 8. In one aspect, the inner body surface 140 can taper from the centerline 124 towards the first body end 112a and the second body end 112b. In another aspect, at the centerline 124, the inner body surface 140 can be a first distance D1 from the axis 101, and at the first body end 112a and/or the second body end 112b, the inner body surface can be a second distance D2 from the axis that is greater than the first distance. That is, prior to machining of the fitting 100, the diameter of the first bore opening 116a and the second bore opening 116b can be greater than the diameter of the bore 118 at a position between the first bore opening and the second bore opening, such as, for example, at the centerline 124. In another aspect, at least a portion of the inner body surface can be at an acute angle relative to the axis 101. For example, at least a portion of the inner body surface extending between the first body end 112a and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the axis 101. In another example, at least a portion of the inner body surface 140 extending between the second body end 112b and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the axis 101. In one aspect, at least a portion of the taper of the inner body surface 140 from the centerline towards each of the first body end 112a and the second body end 112b can be arcuate when viewed in cross-section.

In one aspect, the outer body surface 142 can taper or slope from the centerline 124 towards the first body end 112a and the second body end 112b. In another aspect, at the centerline 124, the outer body surface can be a third distance D3 from the axis 101, and at the first body end 112a and/or the second body end 112b, the inner body surface can be a fourth distance D4 from the axis that is less than the third distance. That is, prior to machining, the outer diameter of the body 112 can be smaller at the first body end 112a and the second body end 112b than at a position between the first body end and the second body end, such as, for example, at the centerline. In another aspect, at least a portion of the outer body surface can be at an acute angle relative to the axis 101. For example, at least a portion of the outer body surface extending between the first body end 112a and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the axis 101. In another example, at least a portion of the outer body surface 140 extending between the second body end 112b and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the axis 101. In one aspect, at least a portion of the taper of the outer body surface 142 from the centerline towards each of the first body end 112a and the second body end 112b can be arcuate when viewed in cross-section.

The first distance D1 from the inner body surface 140 to the axis 101 and/or the third distance D3 from the outer body surface 142 to the axis 101 can vary at different points around the circumference of the bore 118 of the elbow 210. In one aspect, the first distance D1 from the axis to the inner body surface located on an inside bend 212 of the elbow can be greater than or less than the first distance from the axis 101 to the inner body surface 140 located on an outside bend 214 of the elbow 210. Optionally, however, the first distance from the axis to the inner body surface located on the inside bend of the elbow can be substantially equal to the first distance from the axis 101 to the inner body surface 140 located on an outside bend of the elbow 210. In another aspect, the third distance D3 from the axis to the outer body surface 142 located on an inside bend 212 of the elbow can be greater than or less than the third distance from the axis 101 to the outer body surface located on an outside bend 214 of the elbow 210. Optionally, however, the third distance from the axis to the outer body surface located on the inside bend of the elbow can be substantially equal to the third distance from the axis 101 to the outer body surface 142 located on an outside bend 214 of the elbow 210.

FIG. 10 is a cross-sectional view of the elbow 210 of FIG. 8 taken along line 10-10 shown in FIG. 8. In one aspect, in cross-section, the shape formed by the inner body surface 140 can be offset from the shape formed by the outer body surface 142. For example, if the inner body surface 140 and the outer body surface 142 forms circles when viewed in cross-section, the circles can be eccentric circles having different geometric centers. That is, the center of the circle formed by the inner body surface 140 can be offset from the center of the circle formed by the outer body surface 142 by a fifth distance D5.

In use, as described above with regards to the general fitting 100, portions of the cast body 112 of the elbow 210 can be machined off to form the fitting, according to one aspect. The seal 300, spacer 302, and grip ring 304 can be positioned in the seal cavities of the body 112 of the elbow. The jaw 606 can be positioned in the desired position relative to the jaw engagement surface 202 of the elbow 210, and moved from the first position to the second position to urge the jaw engagement surface 202 towards the bore 118 and secure the elbow 210 to the pipe 600.

FIG. 9B is a cross-sectional view of a street elbow 220 similar to the elbow 210 of FIG. 8. According to one aspect, the street elbow can be substantially the same as the elbow 210 except that the second shoulder 124b and the second groove 150b are not formed on the second portion 126b of the street elbow 220. FIG. 9C is a cross-sectional view of a 45 degree elbow 230 similar to the elbow 210 of FIG. 8 taken along line 9-9. According to one aspect, the 45 degree elbow can be substantially the same as the elbow 210 except that a portion of the axis 101 adjacent the first body end 112a can be at an axis angle of about 45 degrees relative to a portion of the axis adjacent the second body end 112b. Of course, other axis angles between the portion of the axis 101 adjacent the first body end relative to the portion of the axis adjacent the second body end 112b are contemplated. For example, the axis angle can be any angle between 0 and 90 degrees, such as for example and without limitation, 15, 30, 60 and 75 degrees.

While the above description of the fitting 100 has been made with reference to a coupling 110 and an elbow 210, the fitting 100 can comprise a tee 310 as illustrated in FIGS. 11-14. In one aspect, the tee 310 can comprise the cast body 112 having the first body end 112a, the second body end 112b, and a third body end 112c. The first body end 112a can be disposed opposite from the second body end 112b, and the body 112 can define a first axis 101a extending from the first body end 112a to the second body end 112b. The third body end 112c can be positioned between the first body end 112a and the second body end 112b, and the body 112 can define a second axis 101b extending transversely from the first axis 101a to the third body end 112c. Unless otherwise stated, all descriptions of radial and axial directions as used herein are relative to the axis of the fitting.

The cast body 112 of the tee 310 can comprise the first neck 120a disposed proximate to the first body end 112a, the second neck 120b disposed proximate to the second body end 112b, and a third neck 120c disposed proximate to the third body end 112c. The center portion 114 can be disposed between the first neck 120a, the second neck 120b and the third neck 120c. The body 112 can define the first shoulder 124a between the center portion 114 and the first neck 120a, the second shoulder 124b between the center portion 114 and the second neck 120b and a third shoulder 124c between the center portion 114 and the third neck 120c. Each of the shoulders 124a,b,c can extend radially inward from the body 112 to the adjacent neck 120a,b,c relative to the respective first axis 101a or second axis 101b.

The cast body 112 of the tee 310 can define the inner body surface 140 and the outer body surface 142 spaced from the inner body surface 140 at a predetermined body thickness. In one aspect, the predetermined body thickness can be the thickness of the wall 144 of the tee 310. The inner body surface 140 can define the fitting bore 118 extending through the body 112 from the first body end 112a to the second body end 112b and to the third body end 112c. The fitting bore can define the first bore opening 116a at the first body end 112a, the second bore opening 116b at the second body end 112b, and a third bore opening 116c at the third body end 112c.

In the present aspect, the fitting body 112 can define the centerline 124 disposed substantially at a midpoint between the first body end 112a and the second body end 112b. The centerline 124 can divide the body 112 into the first portion 126a defined between the centerline 124 and the first body end 112a and the second portion 126b defined between the centerline 124 and the second body end 112b.

Figure 11:
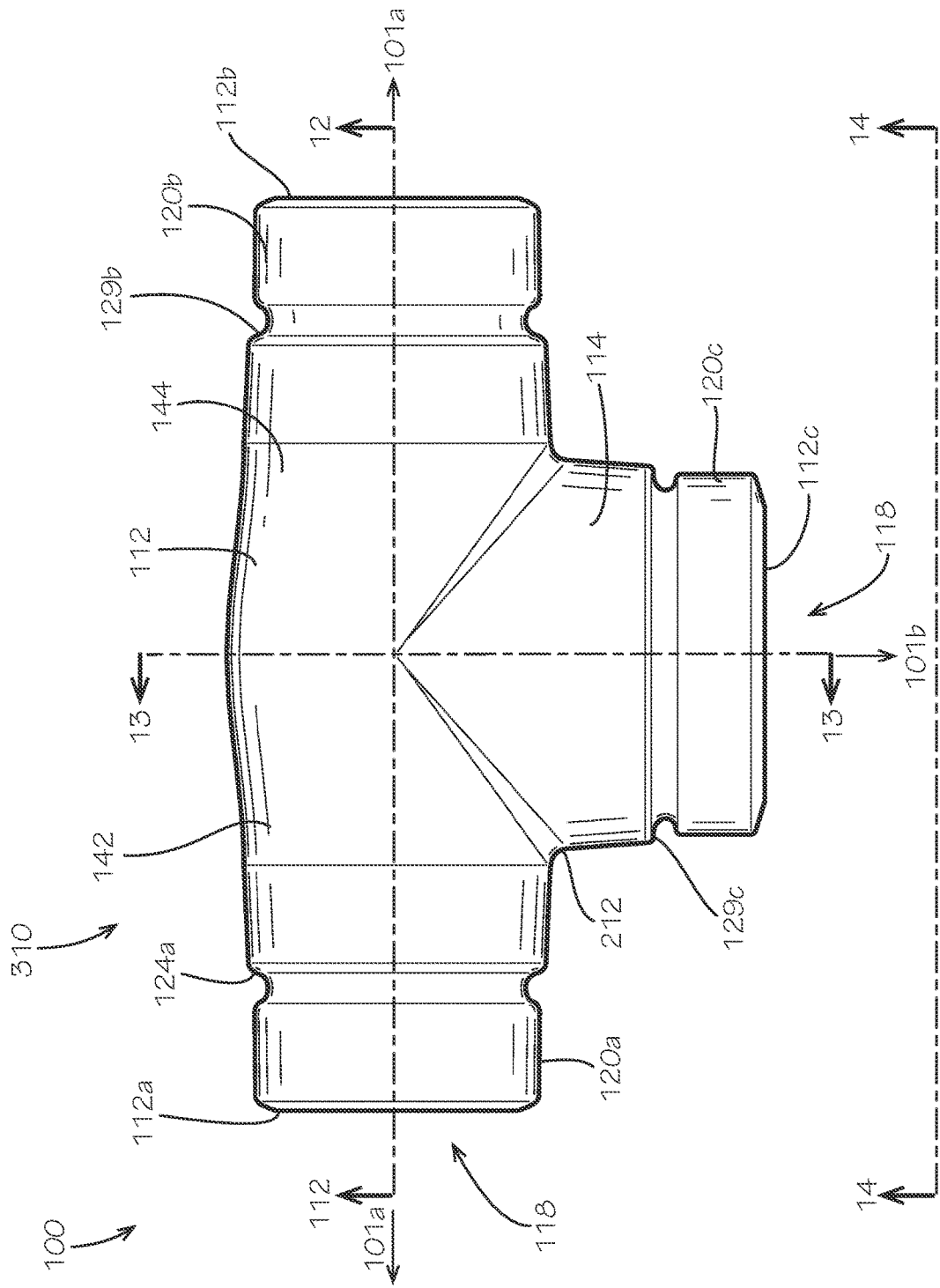
FIG. 11 is an elevational view of a cast fitting in which the fitting is a tee in accordance with one aspect of the present disclosure.
Figure 12:
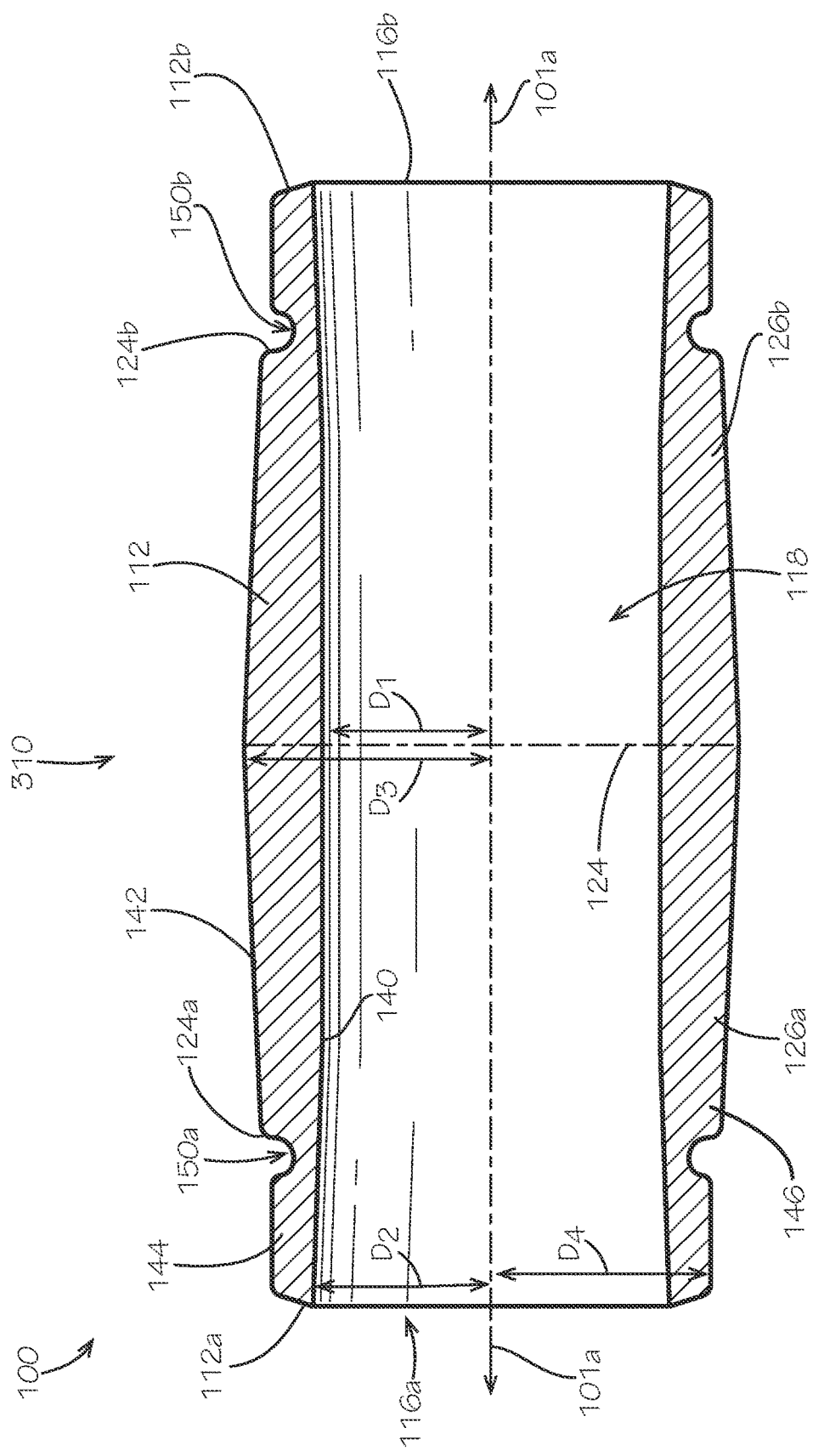
FIG. 12 is a cross-sectional view of the cast fitting of FIG. 11 taken along line 12-12 shown in FIG. 11.

FIG. 12 is a cross-sectional view of the cast body 112 of the tee 310 of FIG. 11 taken along line 12-12 shown in FIG. 11. In one aspect, the inner body surface 140 can taper or slope from the centerline 124 towards the first body end 112a and the second body end 112b. In another aspect, at the centerline 124, the inner body surface 140 can be a first distance D1 from the first axis 101a, and at the first body end 112a and/or the second body end 112b, the inner body surface can be a second distance D2 from the first axis that is greater than the first distance. That is, prior to machining, the diameter of the first bore opening 116a and the second bore opening 116b can be greater than the diameter of the bore 118 at a position between the first bore opening and the second bore opening, such as, for example, at the centerline 124.

In another aspect, at least a portion of the inner body surface 140 can be at an acute angle relative to the first axis 101a. For example, at least a portion of the inner body surface 140 extending between the first body end 112a and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the first axis 101a. In another example, at least a portion of the inner body surface 140 extending between the second body end 112b and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the first axis 101a.

As illustrated in FIG. 12, the taper or slope of the inner body surface 140 from the centerline 124 towards each of the first body end 112a and the second body end 112b can be substantially constant such that at least a portion of the inner body surface 140 is substantially linear in cross-section from the centerline 124 to the first body end 112a and from the centerline to the second body end 112b. Thus, in the present aspect, the inner body surface 140 can define a first frustoconical shape that tapers from the first body end 112a towards the centerline and a second frustoconical shape that tapers from the second body end 112b towards the centerline. Alternatively, in other aspects, the slope from the centerline 124 towards each of the first body end 112a and the second body end 112b need not be substantially constant such that a portion of the inner body surface 140 from the first body end to the centerline can have a different slope than at least one other portion of the inner body surface from the first body end 112a to the centerline. Optionally, at least a portion of the taper from the centerline 124 towards each of the first body end 112a and the second body end 112b can be arcuate when viewed in cross-section.

In one aspect, the outer body surface 142 can taper or slope from the centerline 124 towards the first body end 112a and the second body end 112b. In another aspect, at the centerline 124, the outer body surface 142 can be a third distance D3 from the first axis 101a, and at the first body end 112a and/or the second body end 112b, the outer body surface 142 can be a fourth distance D4 from the first axis that is less than the third distance. That is, prior to machining, the outer diameter of the body 112 can be smaller at the first body end 112a and the second body end 112b than at a position between the first body end and the second body end, such as, for example, at the centerline 124.

In another aspect, at least a portion of the outer body surface 142 can be at an acute angle relative to the first axis 101a. For example, at least a portion of the outer body surface extending between the first body end 112a and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the first axis 101a. In another example, at least a portion of the outer body surface 140 extending between the second body end 112b and the centerline 124 can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the first axis 101a.

As illustrated in FIG. 12, the taper or slope of the outer body surface 142 from the centerline 124 towards each of the first body end 112a and the second body end 112b can be substantially constant such that at least a portion of the outer body surface is substantially linear in cross-section from the centerline 124 to the first body end 112a and from the centerline to the second body end 112b. Thus, in the present aspect, the outer body surface 142 can define a first frustoconical shape that tapers from the centerline towards the first body end 112a and a second frustoconical shape that tapers from the centerline towards the second body end 112b. Alternatively, in other aspects, the taper from the centerline 124 towards each of the first body end 112a and the second body end 112b need not be substantially constant such that a portion of the outer body surface 142 from the first body end to the centerline can have a different slope than at least one other portion of the outer body surface from the first body end 112a to the centerline. Optionally, at least a portion of the taper from the centerline towards each of the first body end 112a and the second body end 112b can be arcuate when viewed in cross-section.

Figure 13:
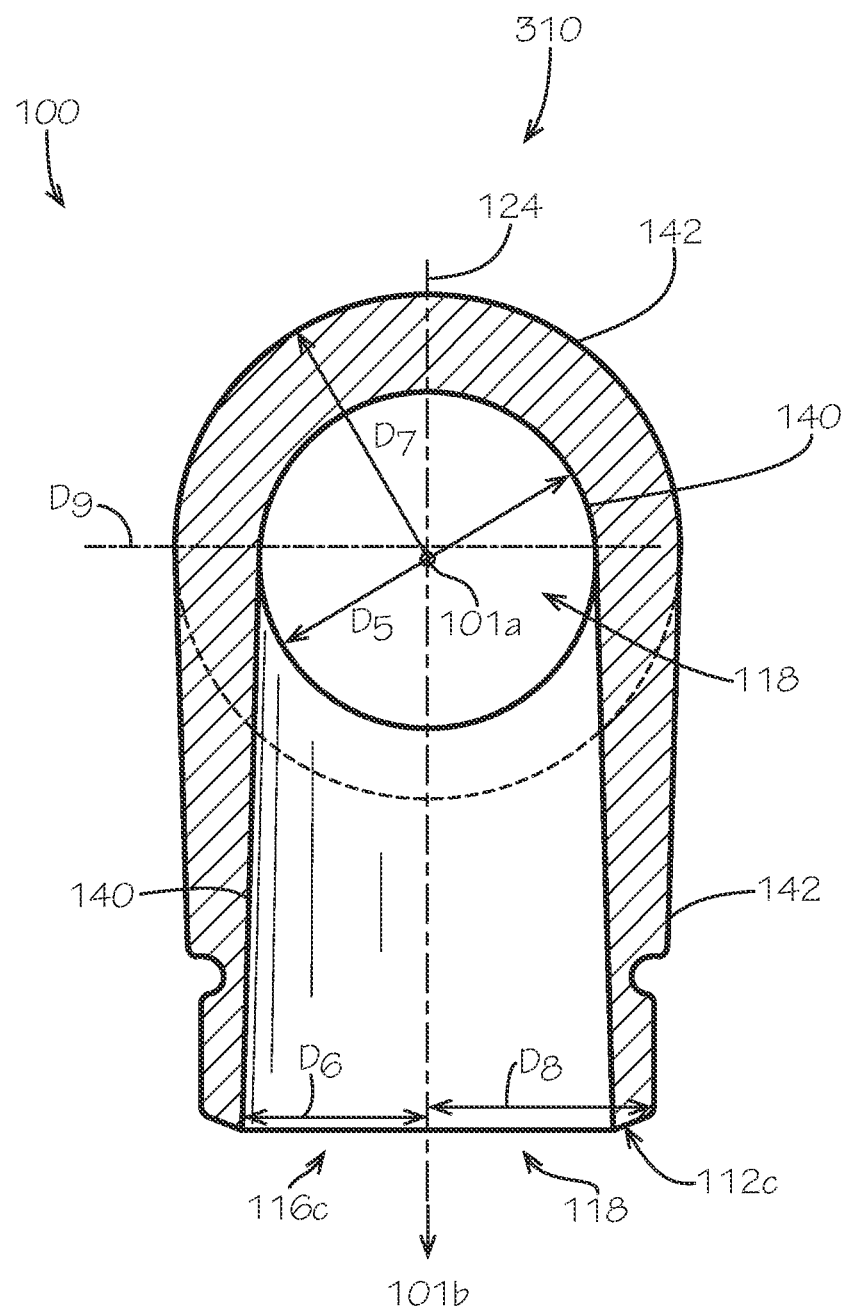
FIG. 13 is a cross-sectional view of the cast fitting of FIG. 11 taken along line 13-13 shown in FIG. 11.

FIG. 13 is a cross-sectional view of the tee 310 of FIG. 11 taken along line 13-13 shown in FIG. 11. In one aspect, the inner body surface 140 can taper from a plane containing the first axis 101a towards the third body end 112c. In another aspect, at the intersection of the first axis 101a and the centerline 124, the inner body surface 140 can be a fifth distance D5 from the second axis 101b, and at the third body end 112c, the inner body surface can be a sixth distance D6 from the second axis that is greater than the fifth distance. That is, prior to machining, the diameter of the third bore opening 116c can be greater than the diameter of the bore 118 at the intersection of the first axis 101a and the centerline 124. In another aspect, at least a portion of the inner body surface can be at an acute angle relative to the second axis 101b. For example, at least a portion of the inner body surface 140 extending between the third body end 112c and the plane containing the first axis 101a can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the second axis 101b.

As illustrated in FIG. 13, the taper or slope of the inner body surface 140 towards the third body end 112c can be substantially constant such that at least a portion of the inner body surface 140 is substantially linear in cross-section. Thus, in the present aspect, the inner body surface 140 can define a first frustoconical shape that tapers from the third body end 112c towards the first axis 101a. Alternatively, in other aspects, the taper towards the third body end 112c need not be substantially constant such that a portion of the inner body surface 140 can have a different slope than at least one other portion of the inner body surface 140 adjacent the third body end 112c. Optionally, at least a portion of the taper of the inner body surface 140 towards the third body end 112c can be arcuate when viewed in cross-section.

In one aspect, the outer body surface 142 of the tee 310 can taper or slope from a plane containing the first axis 101a towards the third body end 112c. In another aspect, at the intersection of the first axis 101a and the centerline 124, the outer body surface 142 can be a seventh distance D7 from the second axis 101b, and at the third body end 112c, the outer body surface 142 can be an eight distance D8 from the second axis that is greater than the seventh distance. Thus, prior to machining, the outer diameter of the body 112 can be greater at the intersection of the first axis 101a and the centerline 124 than the outer diameter of the body at the third body end 112c. In another aspect, at least a portion of the outer body surface 142 can be at an acute angle relative to the second axis 101b. For example, at least a portion of the outer body surface extending between the third body end 112c and a plane containing the first axis 101a can be at an angle of less than about 1 degree, about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, or more than about 15 degrees relative to the second axis 101b As illustrated in FIG. 13, the taper or slope of the outer body surface 142 towards the third body end 112c can be substantially constant such that at least a portion of the outer body surface 142 is substantially linear in cross-section. Thus, in the present aspect, the outer body surface 142 can define a frustoconical shape that tapers towards the third body end 112c. Alternatively, in other aspects, the taper towards the third body end 112c need not be substantially constant such that a portion of the outer body surface 142 can have a different slope than at least one other portion of the outer body surface 142 adjacent the third body end 112c. Optionally, at least a portion of the taper of the outer body surface 142 towards the third body end 112c can be arcuate when viewed in cross-section.

The fifth distance D5 from the inner body surface 140 to the second axis 101b and/or the seventh distance D7 from the outer body surface 142 to the second axis 101b can vary at different points around the circumference of the bore 118 of the tee 310. In one aspect, the fifth distance D5 from the second axis 101b to the inner body surface 142 located on an inside bend 212 of the tee can be greater than or less than the fifth distance D5 from the second axis 101b to the inner body surface 140 located at other portions of the tee. Optionally, however, the fifth distance D5 from the second axis 101b to the inner body surface 140 located on the inside bend of the tee 310 can be substantially equal to the fifth distance D5 located at other portions of the tee 310. In another aspect, the seventh distance D7 from the second axis to the outer body surface located on an inside bend 212 of the tee 310 can be greater than or less than the seventh distance D7 from the second axis 101b to the outer body surface 142 located at other portions of the tee. Optionally, however, the seventh distance D7 from the second axis 101b to the outer body surface 142 located on the inside bend of the elbow can be substantially equal to the seventh distance D7 located at other portions of the tee 310.

As can be seen in FIG. 13, in cross-section, the shape formed by the inner body surface 140 can be offset from the shape formed by the outer body surface 142. For example, if the inner body surface 140 and the outer body surface 142 forms partial circles when viewed in cross-section, the circles can be eccentric circles having different geometric centers. That is, the center of the partial circle formed by the inner body surface can be offset from the center of the partial circle formed by the outer body surface by a ninth distance D9.

Figure 14:
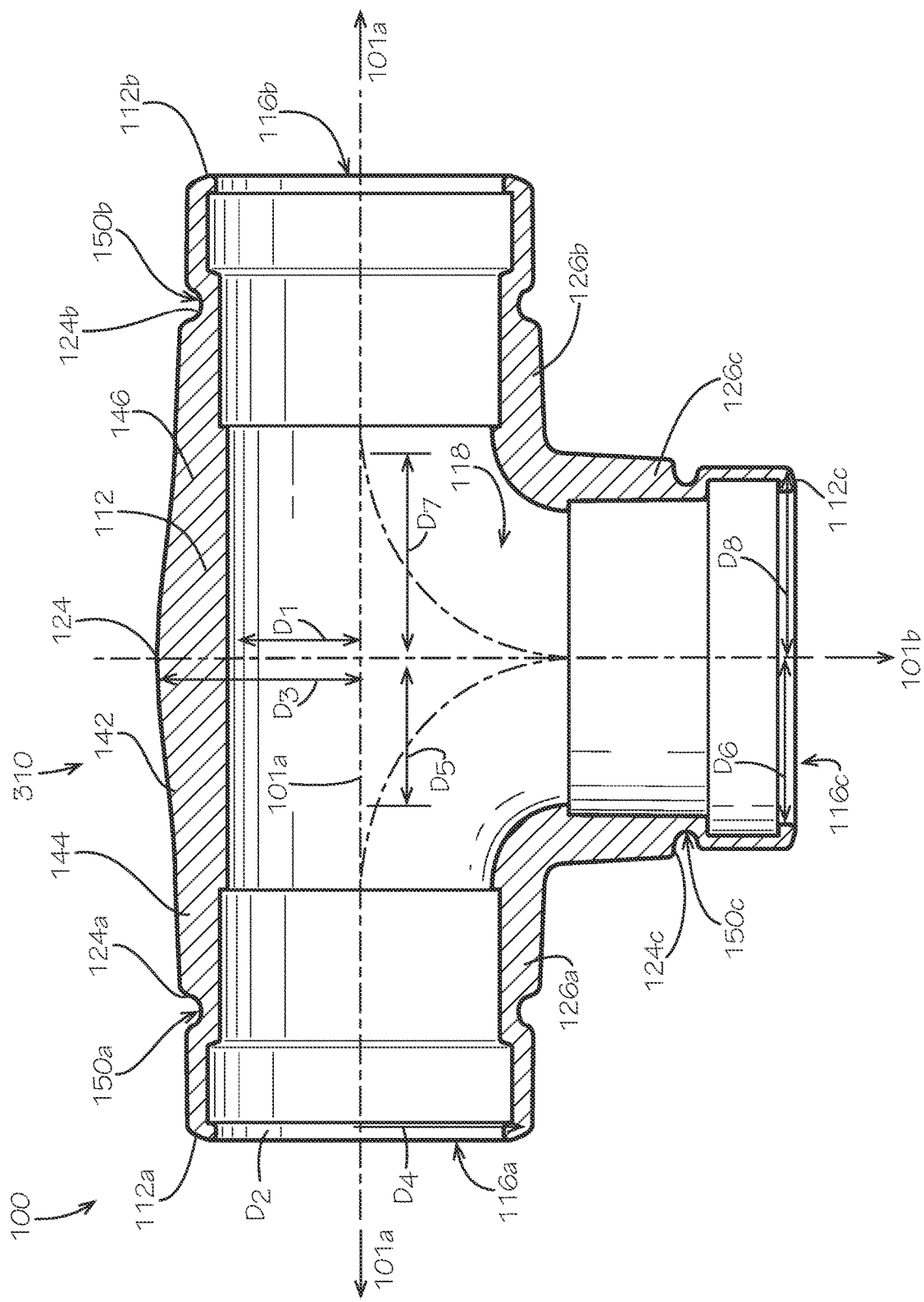
FIG. 14 is a cross-sectional view of the cast fitting of FIG. 11 taken along line 14-14 shown in FIG. 11.

FIG. 14 is a cross-sectional view of the cast body 112 of FIG. 11 after portions of the cast body 112 have been machined off to form the machined fitting, according to one aspect and as described above. In use, the seal 300, spacer 302 and grip ring 304 can be positioned in the seal cavities of the body 112 of the tee 310. The jaw 606 can be positioned in the desired position relative to the jaw engagement surface 202 of the tee 310 and moved from the first position to the second position to urge the jaw engagement surface 202 towards the bore 118 and secure the tee 310 to a pipe 600.

Figure 15:
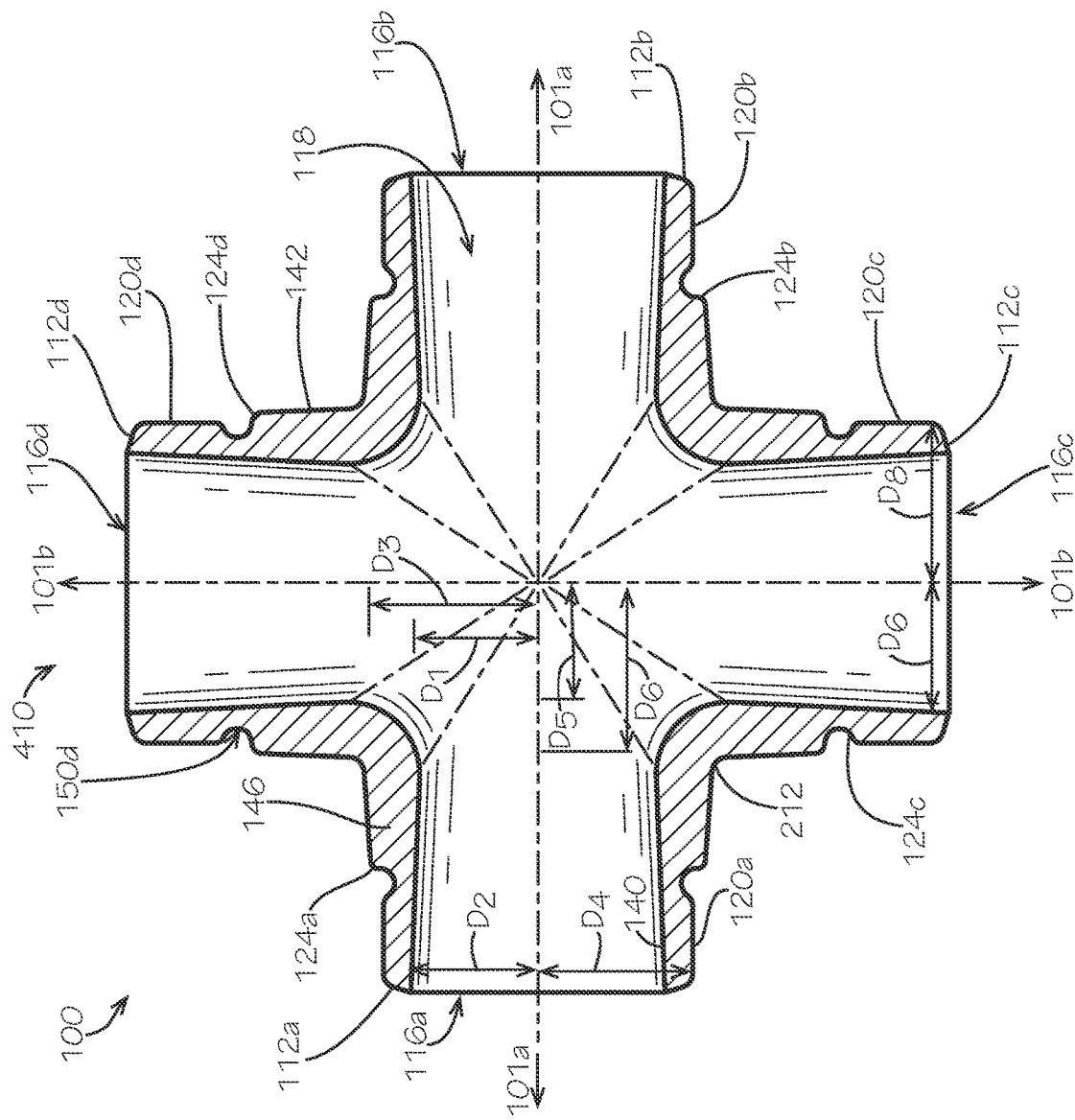
FIG. 15 is a cross-sectional view of a cast fitting in which the fitting is a cross in accordance with one aspect of the present disclosure.

FIGS. 15-23 illustrate the casting 146 cross-sectional profile of various other fittings 100. FIG. 15 is a cross-sectional profile of the casting 146 of a cross 410, according to one aspect. In this aspect, the cross 410 can be similar to the tee 310 described above with the addition of a fourth body end 112d disposed opposite from the third body end 112c, a fourth neck 120d disposed proximate to the fourth body end 112d and the center portion 114 disposed between the first neck 120a, the second neck 120b, the third neck 120c and the fourth neck. The body 112 of the cross 410 can define the fourth shoulder 124d between the center portion and the fourth neck 120d, and the bore 118 can define a fourth bore opening 116d at the fourth body end 112d. A fourth groove 150d can be positioned between the centerline 124 and the fourth body end 112d.

Figure 16:
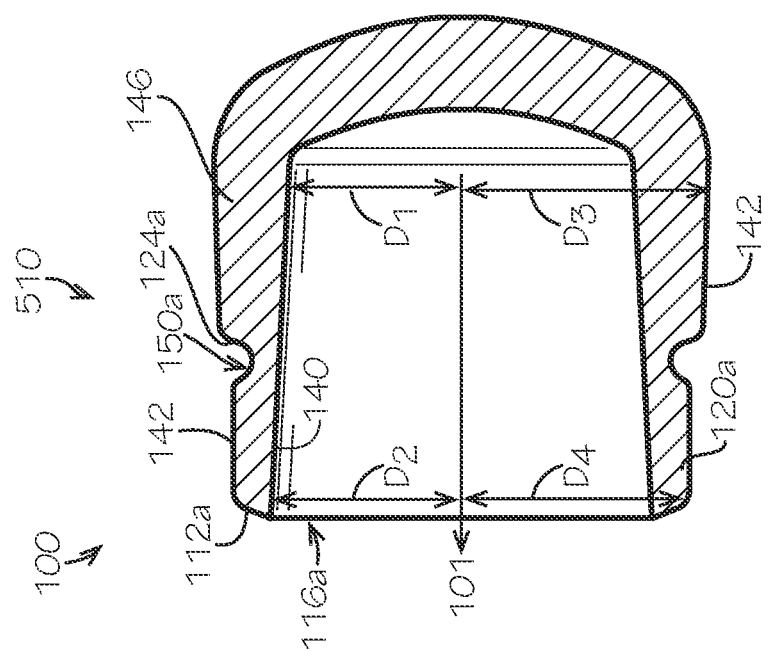
FIG. 16 is a cross-sectional view of a cast fitting in which the fitting is a cap in accordance with one aspect of the present disclosure.

FIG. 16 is a cross-sectional profile of the casting 146 of a cap 510, according to one aspect. In this aspect, the cap 510 can be similar to a portion of the coupling 110 described above. The cap 510, however, can have a covered second bore opening 116b to prevent fluid from flowing through the bore 118.

Figure 17:
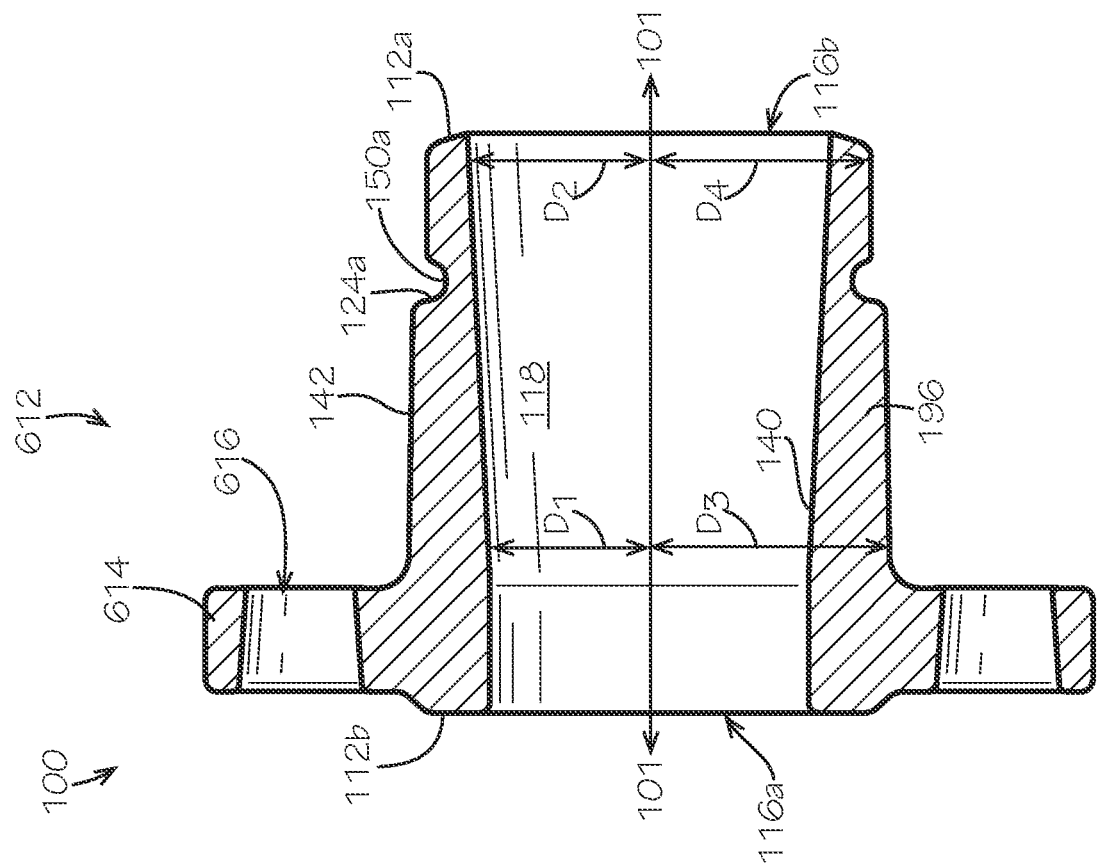
FIG. 17 is a cross-sectional view of a cast fitting in which the fitting is a flanged adapter in accordance with one aspect of the present disclosure.

FIG. 17 is a cross-sectional profile of the casting 146 of a flanged adapter 612, according to one aspect. In this aspect, the flanged adapter 612 can be similar to a portion of the coupling 110 described above. The flanged adapter 612, however, can have a flange 614 defining a plurality of mounting holes 616. The second body end 112b can be configured to abut a surface (and not necessarily configured to couple to a pipe).

Figure 18:
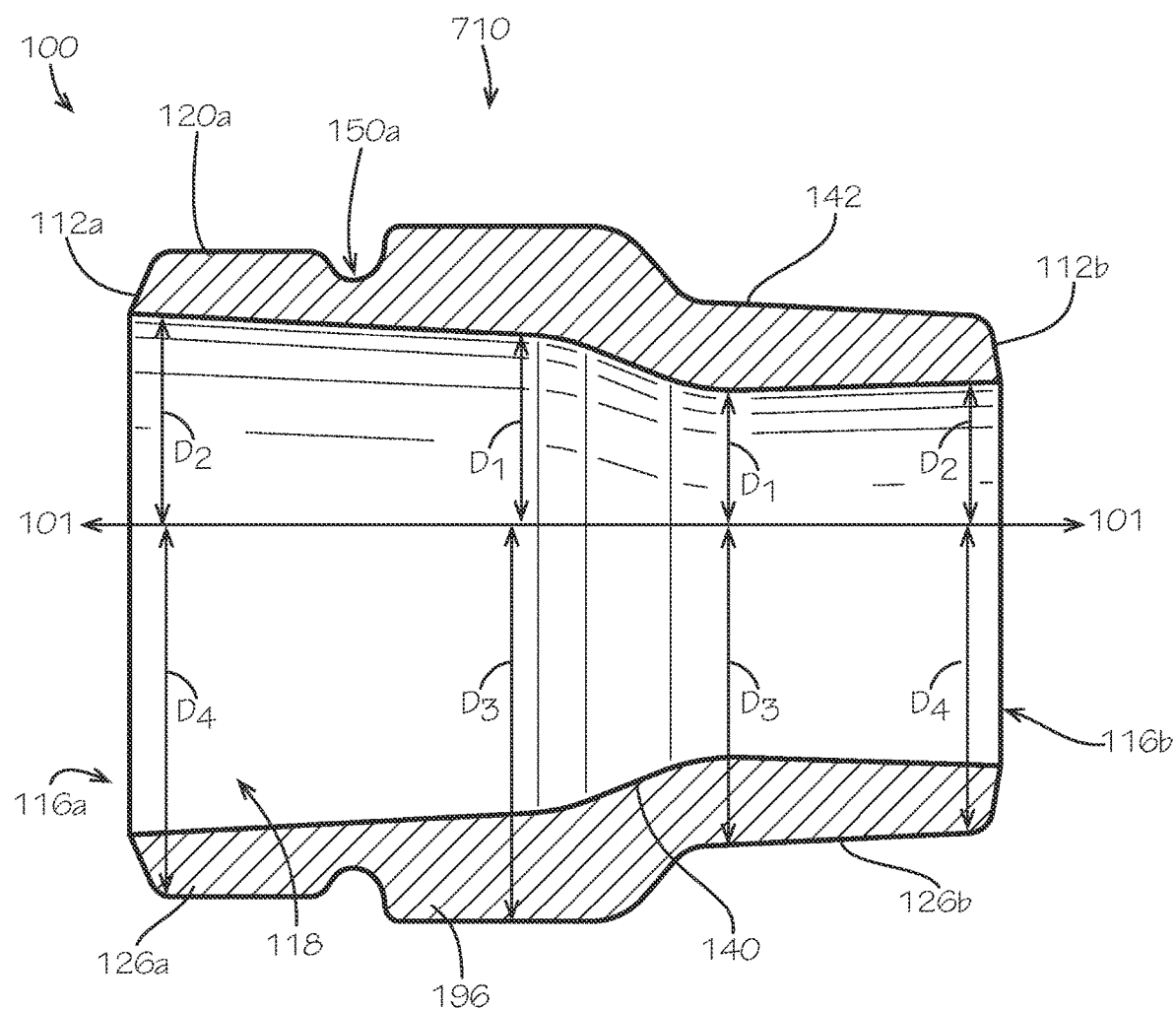
FIG. 18 is a cross-sectional view of a cast fitting in which the fitting is a second adapter in accordance with one aspect of the present disclosure.

FIG. 18 is a cross-sectional profile of the casting 146 of a second adapter 710, according to one aspect. In this aspect, the fitting 100 does not have the second shoulder 124b and the second groove 150b formed on the second portion 126b of the second adapter. Note also that the first distance D1, the second distance D2, the third distance D3 and the fourth distance D4 can be different at each portion of the second adapter 710. That is, the amount of taper or slope of the inner body surface 140, and the amount of taper or slope of the outer body surface 142 can be different at different portions of the second adapter 710.

Figure 19:
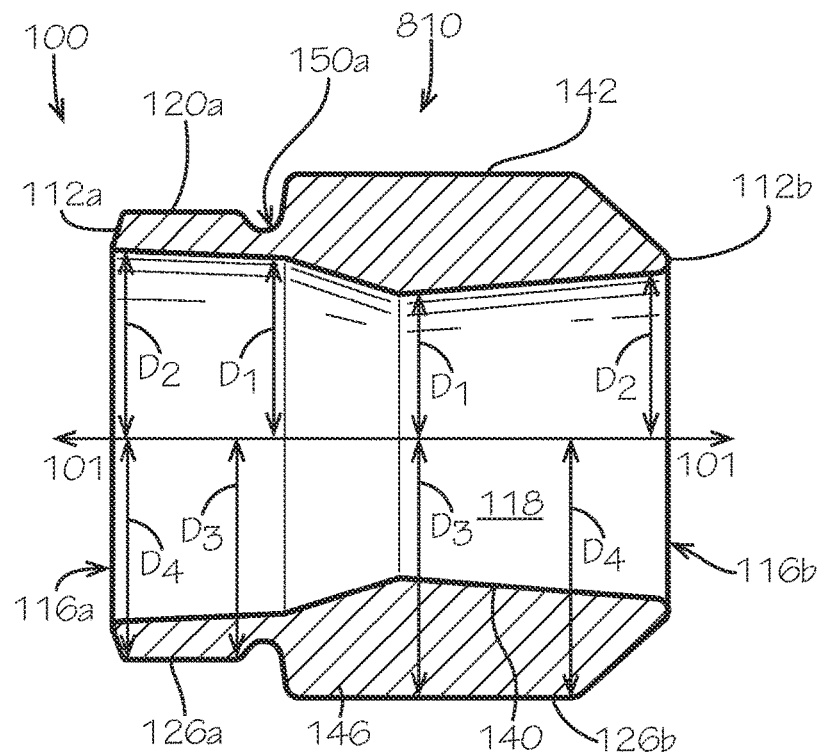
FIG. 19 is a cross-sectional view of a cast fitting in which the fitting is a third adapter in accordance with one aspect of the present disclosure.

FIG. 19 is a cross-sectional profile of the casting 146 of a third adapter 810, according to another aspect. In this aspect, the fitting 100 does not have the second shoulder 124b and the second groove 150b formed on the second portion 126b of the third adapter. Note also that the first distance D1, the second distance D2, the third distance D3 and the fourth distance D4 can be different at each portion of the third adapter 810. That is, the amount of taper or slope of the inner body surface 140, and the amount of taper or slope of the outer body surface 142 can be different at different portions of the third adapter 810.

Figure 20:
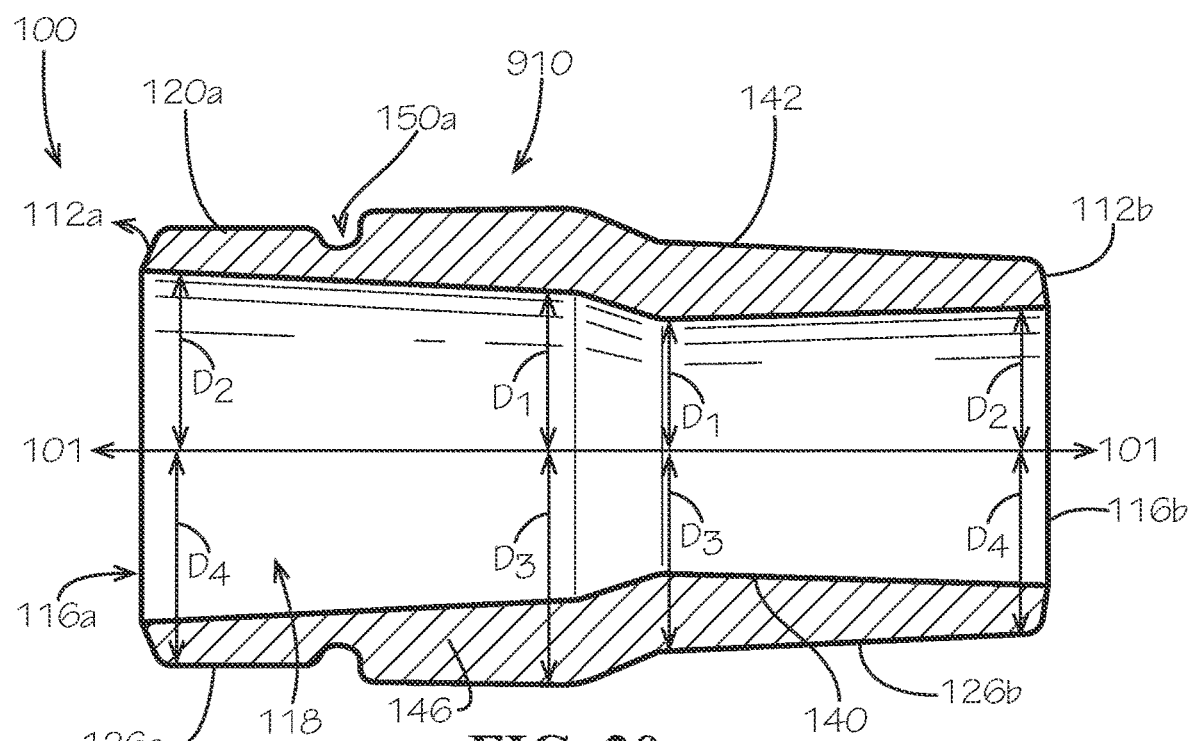
FIG. 20 is a cross-sectional view of a cast fitting in which the fitting is a reducer in accordance with one aspect of the present disclosure.

FIG. 20 is a cross-sectional profile of the casting 146 of a reducer 910, according to another aspect. In this aspect, the fitting 100 does not have the second shoulder 124b and the second groove 150b formed on the second portion 126b of the reducer. Note also that the first distance D1, the second distance D2, the third distance D3 and the fourth distance D4 can be different at each portion of the reducer 910. That is, the amount of taper or slope of the inner body surface 140, and the amount of taper or slope of the outer body surface 142 can be different at different portions of the reducer 910.

Figure 21:
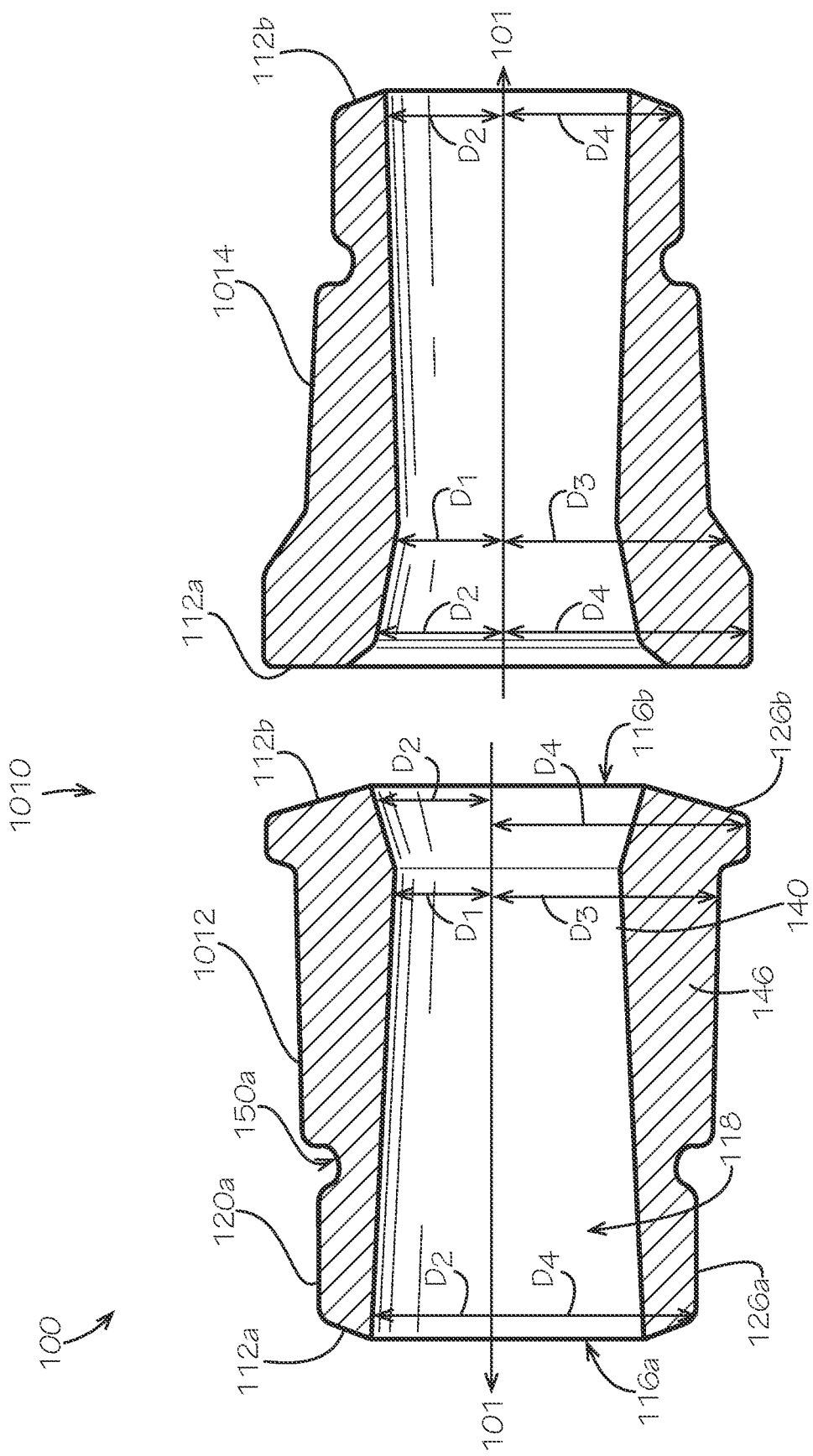
FIG. 21 is a cross-sectional view of a cast fitting in which the fitting is a union in accordance with one aspect of the present disclosure.

FIG. 21 is a cross-sectional profile of the casting 146 of two sections of a union 1010, according to one aspect. In this aspect, a first section 1012 of the union 1010 can be spaced from a second section 1014 of the union 1010. Each of the first section 1012 and the second section 1014 can have at least one groove 150 defined therein. In one aspect, each of the first section 1012 and the second section 1014 can have the tapered inner body surface 140 and the tapered outer body surface 142. In another aspect, at least a portion of the slope of the inner body surface 140 of the first section 1012 can be greater than, less than, or substantially the same as the slope of the inner body surface 140 of the second section 1014. In a further aspect, at least a portion of the slope of the outer body surface 142 of the first section 1012 can be greater than, less than, or substantially the same as the slope of the outer body surface 142 of the second section 1014. In a further aspect, the amount of taper or slope of the inner body surface 140 and the amount of taper or slope of the outer body surface 142 can be different at different portions of the union 1010.

Figure 22:
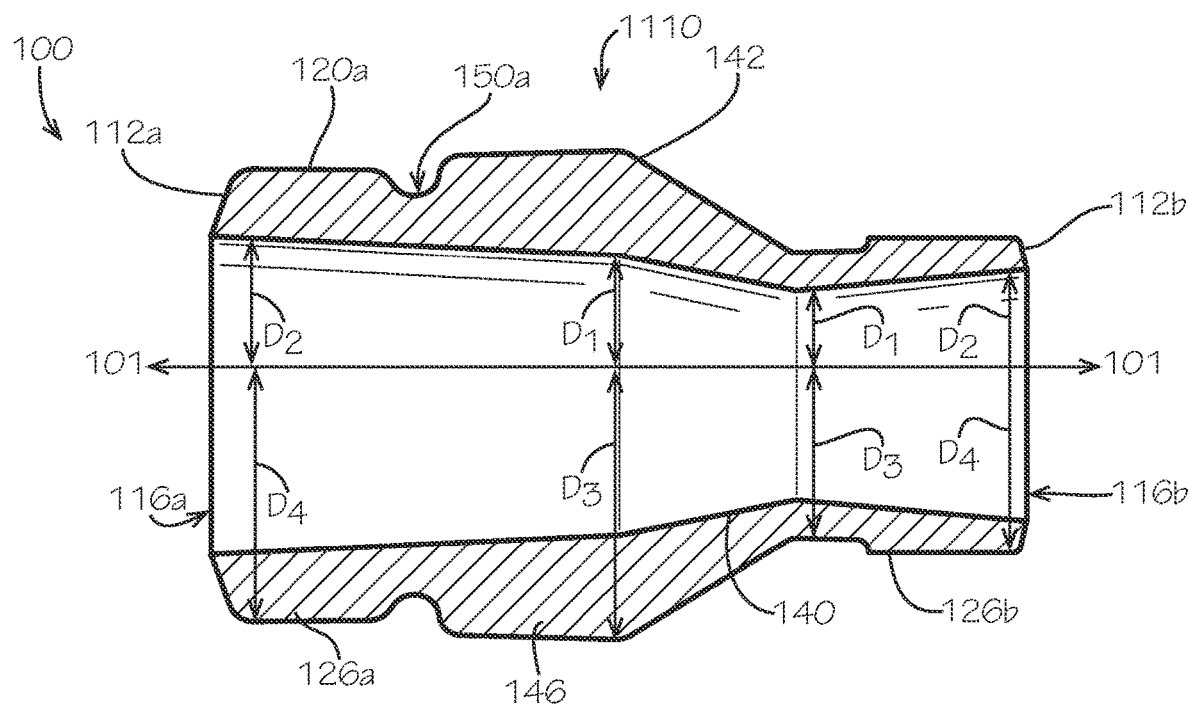
FIG. 22 is a cross-sectional view of a cast fitting in which the fitting is a fourth adapter in accordance with one aspect of the present disclosure.

FIG. 22 is a cross-sectional profile of the casting 146 of a fourth adapter 1110, according to another aspect. In this aspect, the fitting 100 does not have the second shoulder 124b and the second groove 150b formed on the second portion 126b of the fourth adapter. Note also that the first distance D1, the second distance D2, the third distance D3 and the fourth distance D4 can be different at each portion of the fourth adapter 1110. That is, the amount of taper or slope of the inner body surface 140 and the amount of taper or slope of the outer body surface 142 can be different at different portions of the fourth adapter 1110.

Figure 23:
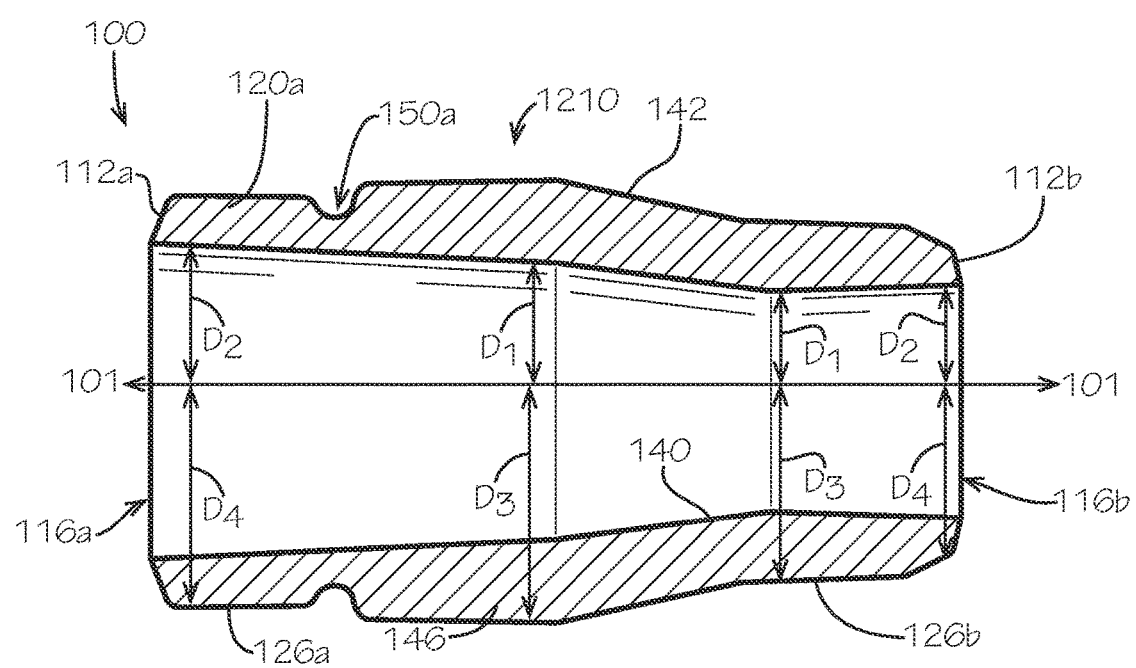
FIG. 23 is a cross-sectional view of a cast fitting in which the fitting is a fifth adapter in accordance with one aspect of the present disclosure.

FIG. 23 is a cross-sectional profile of the casting 146 of a fifth adapter 1210, according to another aspect. In this aspect, the fitting 100 does not have the second shoulder 124b and the second groove 150b formed on the second portion 126b of the fifth adapter 1210. Note also that the first distance D1, the second distance D2, the third distance D3 and the fourth distance D4 can be different at each portion of the fifth adapter 1210. That is, the amount of taper or slope of the inner body surface 140 and the amount of taper or slope of the outer body surface 142 can be different at different portions of the fifth adapter 1210.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of connecting a pipe to a cast fitting, the method comprising:
    casting a body comprising:
        a first body end and a second body end disposed opposite from the first body end, wherein the body defines an axis extending from the first body end to the second body end, wherein the body comprises a first neck disposed proximate to the first body end wherein the body further comprises an inner body surface defining a bore extending through the body from the first body end to the second body end, and wherein the body further comprises an outer body surface spaced from the inner body surface a predetermined wall thickness,
    wherein at a first location on the axis, the inner body surface is unmachined and defines a first distance from the axis, and at a second location on the axis that is spaced from the first location, the inner body surface is unmachined and defines a second distance from the axis that is greater than the first distance, and wherein at the first location, the outer body surface is unmachined and defines a third distance from the axis and at the second location, the outer body surface is unmachined and defines a fourth distance from the axis that is less than the third distance; and
    machining the inner body surface at a portion of the first neck to define a seal cavity in the first neck and machining a portion of the outer body surface of the first neck to form a jaw engagement surface on the first neck, wherein the portion of the first neck defines the second location and wherein the first location is spaced apart from the portion of the first neck.

2. The method of claim 1, further comprising positioning at least one of a seal, a spacer and a grip ring in the seal cavity.

3. The method of claim 2, further comprising providing a press having a jaw positionable around the portion of the first neck, wherein the jaw is movable about and between a first jaw position, in which a lower edge of the jaw is spaced from the jaw engagement surface, and a second jaw position, in which the lower edge of the jaw contacts the jaw engagement surface and urges the portion of the first neck towards the bore.

4. The method of claim 3, further comprising inserting an end of the pipe into the bore; and positioning the jaw around the jaw engagement surface and moving the jaw from the first jaw position to the second jaw position so that the portion of the body engages the pipe.

5. A method of connecting a pipe to a cast fitting, the method comprising:
  casting a body comprising:
    a first body end and a second body end disposed opposite from the first body end, wherein the body defines an axis extending from the first body end to the second body end, wherein the body comprises a first neck disposed proximate to the first body end wherein the body further comprises an inner body surface defining a bore extending through the body from the first body end to the second body end, and wherein the body further comprises an outer body surface spaced from the inner body surface a predetermined wall thickness,
  wherein at a first location on the axis, the inner body surface is unmachined and defines a first distance from the axis, and at a second location on the axis that is spaced from the first location, the inner body surface is unmachined and defines a second distance from the axis that is greater than the first distance, and wherein at the first location, the outer body surface is unmachined and defines a third distance from the axis and at the second location, the outer body surface is unmachined and defines a fourth distance from the axis that is less than the third distance,
  wherein the body has a centerline disposed substantially at a midpoint between the first body end and the second body end, and wherein the first location on the axis is at the centerline.

6. A method, comprising:
casting a body comprising:
  a first body end comprising a first neck disposed proximate to the first body end;
  a second body end comprising a second neck disposed opposite from the first body end;
  an inner body surface defining a bore extending along an axis through the body from the first body end to the second body end; and
  an outer body surface defining a wall thickness from the inner body surface, and wherein:
    at a first location on the axis, the inner body surface is unmachined and defines a first distance, and the outer body surface defines a second distance from the axis;
    at a second location on the axis that is spaced from the first location, the inner body surface defines a third distance, and the outer body surface defines a fourth distance from the axis;
    the first distance is less than the third distance; and
    the second distance is greater than the fourth distance;
machining a portion of the inner body surface at the first neck to form a seal cavity in the inner body surface at the first neck; and
machining a portion of the outer body surface at the first neck to form a jaw engagement surface on the outer body surface of the first neck.

* * * * *